(12) United States Patent
Shiohara

(10) Patent No.: US 12,547,354 B2
(45) Date of Patent: Feb. 10, 2026

(54) METHOD OF CONTROLLING INFORMATION PROCESSING APPARATUS, EDITING INTERMEDIATE DATA, AND CONVERTING EDITED INTERMEDIATE DATA INTO PRINTING DATA

(71) Applicant: CANON KABUSHIKI KAISHA, Tokyo (JP)

(72) Inventor: Tetsuya Shiohara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/783,691

(22) Filed: Jul. 25, 2024

(65) Prior Publication Data

US 2024/0385782 A1    Nov. 21, 2024

Related U.S. Application Data

(63) Continuation of application No. 18/388,566, filed on Nov. 10, 2023, now Pat. No. 12,079,524, which is a
(Continued)

(30) Foreign Application Priority Data

Aug. 31, 2021    (JP) ................. 2021-141472

(51) Int. Cl.
G06F 3/12    (2006.01)
(52) U.S. Cl.
CPC .......... G06F 3/1206 (2013.01); G06F 3/1228 (2013.01)
(58) Field of Classification Search
CPC .............. G06F 3/1206; G06F 3/1228
(Continued)

(56) References Cited

U.S. PATENT DOCUMENTS 7,859,709 B2 * 12/2010 Mori ................. G06F 40/103
                                                        358/1.18
8,199,144 B2 *  6/2012 Sakura .............. G06F 3/1205
                                                         358/1.9
(Continued)

FOREIGN PATENT DOCUMENTS

JP    2019-074906 A    5/2019
JP    2020-004254 A    1/2020
(Continued)

OTHER PUBLICATIONS

Japanese Office Action dated Jul. 15, 2025, in related Japanese Patent Application No. 2021-141472.

*Primary Examiner* — Allen H Nguyen
(74) *Attorney, Agent, or Firm* — VENABLE LLP

(57) ABSTRACT

A method of controlling an information processing apparatus configured to execute an extension application associated with printing data generation software operable in the information processing apparatus to extend a function includes: adding information on an extended function to printing function information used in the printing data generation software; switching in accordance with a setting value stored in common information shared with the extension application whether to perform skip processing in which conversion processing of intermediate data performed by the printing data generation software is skipped; and editing the intermediate data in which the conversion processing is skipped in the printing data generation software in the switching and converting the edited intermediate data into printing data.

11 Claims, 20 Drawing Sheets

Related U.S. Application Data continuation of application No. 17/892,258, filed on Aug. 22, 2022, now Pat. No. 11,842,091.

(58) Field of Classification Search
USPC ..................................................... 358/1.13
See application file for complete search history.

(56) References Cited

U.S. PATENT DOCUMENTS

| | | |
|---|---|---|
| 8,284,433 B2 | 10/2012 | Nakagiri et al. |
| 8,477,350 B2 | 7/2013 | Jazayeri et al. |
| 8,537,408 B2 | 9/2013 | Natori et al. |
| 8,634,102 B2 | 1/2014 | Shiohara |
| 9,557,947 B2 | 1/2017 | Shiohara |
| 10,402,139 B2 | 9/2019 | Shiohara et al. |
| 10,747,481 B2 | 8/2020 | Kawasaki |
| 11,520,533 B2 | 12/2022 | Suzuki |
| 11,989,462 B2 | 5/2024 | Suzuki |
| 2003/0117641 A1 | 6/2003 | Sugiyama |
| 2005/0179926 A1* | 8/2005 | Nishikawa ............ G06F 3/1285 358/1.18 |
| 2007/0070441 A1* | 3/2007 | Yumita .............. G06K 15/1893 358/450 |
| 2008/0225330 A1 | 9/2008 | Matsuura et al. |
| 2012/0307295 A1 | 12/2012 | Myoki |
| 2020/0341703 A1 | 10/2020 | Kawasaki |
| 2022/0317943 A1 | 10/2022 | Kawasaki |
| 2024/0264780 A1 | 8/2024 | Suzuki |
| 2025/0181281 A1 | 6/2025 | Kawasaki |

FOREIGN PATENT DOCUMENTS

| | | |
|---|---|---|
| JP | 2020-095535 A | 6/2020 |
| JP | 2021-108000 A | 7/2021 |

* cited by examiner

```xml
<?xml version="1.0" encoding="utf-8"?>
<PrintDeviceCapabilities...>
...
<psk:PageMediaSize psf2:psftype="Feature">                                    502
    <psk:ISOA4 psf2:psftype="Option" psf2:default="true">
        <psk12:PortraitImageableSize...>0,0,210000,297000</psk12:PortraitImageableSize>
        <psk:MediaSizeHeight xsi:type="xsd:integer" psf2:psftype="ScoredProperty">297000</psk:MediaSizeHeight>
        <psk:MediaSizeWidth xsi:type="xsd:integer" psf2:psftype="ScoredProperty">210000</psk:MediaSizeWidth>
    </psk:ISOA4>
    <psk:NorthAmericaLetter psf2:psftype="Option">
        <psk12:PortraitImageableSize...>0,0,215900,279400</psk12:PortraitImageableSize>
        <psk:MediaSizeHeight xsi:type="xsd:integer" psf2:psftype="ScoredProperty">279400</psk:MediaSizeHeight>
        <psk:MediaSizeWidth xsi:type="xsd:integer" psf2:psftype="ScoredProperty">215900</psk:MediaSizeWidth>
    </psk:NorthAmericaLetter>
</psk:PageMediaSize>
<psk:PageMediaType psf2:psftype="Feature">
    <psk:Plain psf2:psftype="Option" psf2:default=" true" />
    <psk:Photographic psf2:psftype="Option" psf2:default="false" />           503
</psk:PageMediaType>
<psk:PageOrientation psf2:psftype="Feature">
    <psk:Portrait psf2:psftype="Option" psf2:default="true" />
    <psk:Landscape psf2:psftype="Option" psf2:default="false" />              504
</psk:PageOrientation>
...
</PrintDeviceCapabilities>
```

```xml
<?xml version="1.0" encoding="utf-8"?>
<PrintDeviceCapabilities...>
...
<psk:PageMediaSize psf2:psftype="Feature">
  <psk:ISOA4 psf2:psftype="Option" psf2:default="true">
    <psk12:PortraitImageableSize...>0,0,210000,297000</psk12:PortraitImageableSize>
    <psk:MediaSizeHeight xsi:type="xsd:integer" psf2:psftype="ScoredProperty">297000</psk:MediaSizeHeight>
    <psk:MediaSizeWidth xsi:type="xsd:integer" psf2:psftype="ScoredProperty">210000</psk:MediaSizeWidth>
  </psk:ISOA4>
  <psk:NorthAmericaLetter psf2:psftype="Option">
    <psk12:PortraitImageableSize ...>0,0,215900,279400</psk12:PortraitImageableSize>
    <psk:MediaSizeHeight xsi:type="xsd:integer" psf2:psftype="ScoredProperty">279400</psk:MediaSizeHeight>
    <psk:MediaSizeWidth xsi:type="xsd:integer" psf2:psftype="ScoredProperty">215900</psk:MediaSizeWidth>
  </psk:NorthAmericaLetter>
</psk:PageMediaSize>
<psk:PageMediaType psf2:psftype="Feature">
  <psk:Plain psf2:psftype="Option" psf2:default=" true" />
  <psk:Photographic psf2:psftype="Option" psf2:default="false" />
</psk:PageMediaType>
<psk:PageOrientation psf2:psftype="Feature">
  <psk:Portrait psf2:psftype="Option" psf2:default="true" />
  <psk:Landscape psf2:psftype="Option" psf2:default="false" />
</psk:PageOrientation>
...
<psk:JobNUpAllDocumentsContiguously psf2:psftype="Feature">
  <ns0000:None psf2:psftype="Option" psf2:default="true" />
  <ns0000:PagesPerSheet_2 psf2:psftype="Option" psf2:default="false" />
  <ns0000:PagesPerSheet_4 psf2:psftype="Option" psf2:default="false" />
</psk:PageOrientation>
...
</PrintDeviceCapabilities>
```

```
<psf:PrintCapabilities ...>
 <psf:Feature name="psk:PageMediaSize">
  ...
  <psf:Option name="psk:NorthAmericaLetter" constrained="psk:None">
   <psf:ScoredProperty name="psk:MediaSizeWidth">
    <psf:Value xsi:type="xsd:integer">215900</psf:Value>
   </psf:ScoredProperty>
   <psf:ScoredProperty name="psk:MediaSizeHeight">
    <psf:Value xsi:type="xsd:integer">279400</psf:Value>
   </psf:ScoredProperty>
  </psf:Option>
  <psf:Option name="psk:NorthAmericaLetter" constrained="psk:None">
   <psf:ScoredProperty name="psk:ISO A4">
    <psf:Value xsi:type="xsd:integer">210000</psf:Value>
   </psf:ScoredProperty>
   <psf:ScoredProperty name="psk:MediaSizeHeight">
    <psf:Value xsi:type="xsd:integer">297000</psf:Value>
   </psf:ScoredProperty>
  </psf:Option>
 </psf:Feature>
 <psf:Feature name="psk:PageMediaType">
  ...
  <psf:Option name="psk:Plain" constrained="psk:None"/>
  <psf:Option name="psk:PhotoPaper" constrained="psk:None"/>
 </psf:Feature>
 <psf:Feature name="psk:PageOrientation">
  ...
  <psf:Option name="psk:Portlait" constrained="psk:None"/>
  <psf:Option name="psk:Landscape" constrained="psk:None"/>
 </psf:Feature>
 <psf:Feature name="psk:JobNUpAllDocumentsContiguously">
  <psf:Option name="ns0000:None" constrained="psk:None"/>
  <psf:Option name="ns0000:PagePerSheet_2" constrained="psk:None"/>
  <psf:Option name="ns0000:PagePerSheet_4" constrained="psk:None"/>
 </psf:Feature>
 ...
</psf:PrintCapabilities>
```

FIG.7

METHOD OF CONTROLLING INFORMATION PROCESSING APPARATUS, EDITING INTERMEDIATE DATA, AND CONVERTING EDITED INTERMEDIATE DATA INTO PRINTING DATA

This application is a continuation of application Ser. No. 18/388,566, filed Nov. 10, 2023, which is a continuation of application Ser. No. 17/892,258, filed Aug. 22, 2022, now U.S. Pat. No. 11,842,091, issued Dec. 12, 2023.

BACKGROUND OF THE INVENTION

Field of the Invention

The present disclosure relates to a technique of extending a printing function.

Description of the Related Art

In recent years, there has been provided a standard class driver (hereinafter, also referred to as a "standard driver") that is usable in common in Windows (registered trademark) and the like for printing apparatuses provided by multiple vendors. Such a standard driver is bundled in a package of an operating system (hereinafter, referred to as an "OS"). The standard driver is configured to be able to designate a printing function in accordance with PrintCapabilities generated based on information obtained from a connected printing apparatus. With this, a user using the standard driver can designate a printing function in accordance with the capability of the connected printing apparatus.

It is possible to associate the standard driver with an application for function extension (hereinafter, also referred to as an "extension application"). The extension application is provided by a vendor providing a printing apparatus. The vendor can provide a function that cannot be implemented by only the standard driver (extended function) by providing the extension application. Japanese Patent Laid-Open No. 2019-74906 (PTL 1) discloses a technique of extending a function such as a stamp function by the extension application.

There have been demanded further ingenuities for the extension application to provide a better function.

SUMMARY OF THE INVENTION

A method of controlling an information processing apparatus according to one aspect of the present disclosure is a method of controlling an information processing apparatus configured to execute an extension application associated with printing data generation software operatable in the information processing apparatus to extend a function, the method including: adding information on an extended function to printing function information used in the printing data generation software; switching in accordance with a setting value stored in common information shared with the extension application whether to perform skip processing in which conversion processing of intermediate data performed by the printing data generation software is skipped; and editing the intermediate data in which the conversion processing is skipped in the printing data generation software in the switching and converting the edited intermediate data into printing data.

Further features of the present invention will become apparent from the following description of exemplary embodiments with reference to the attached drawings.

BRIEF DESCRIPTION OF THE DRAWINGS

FIG. 5 is a diagram illustrating an example of PDC;

FIG. 6 is a diagram illustrating an example of PDC to which a function is added;

FIG. 7 is a diagram illustrating an example of capability information;

DESCRIPTION OF THE EMBODIMENTS

Figure 1:
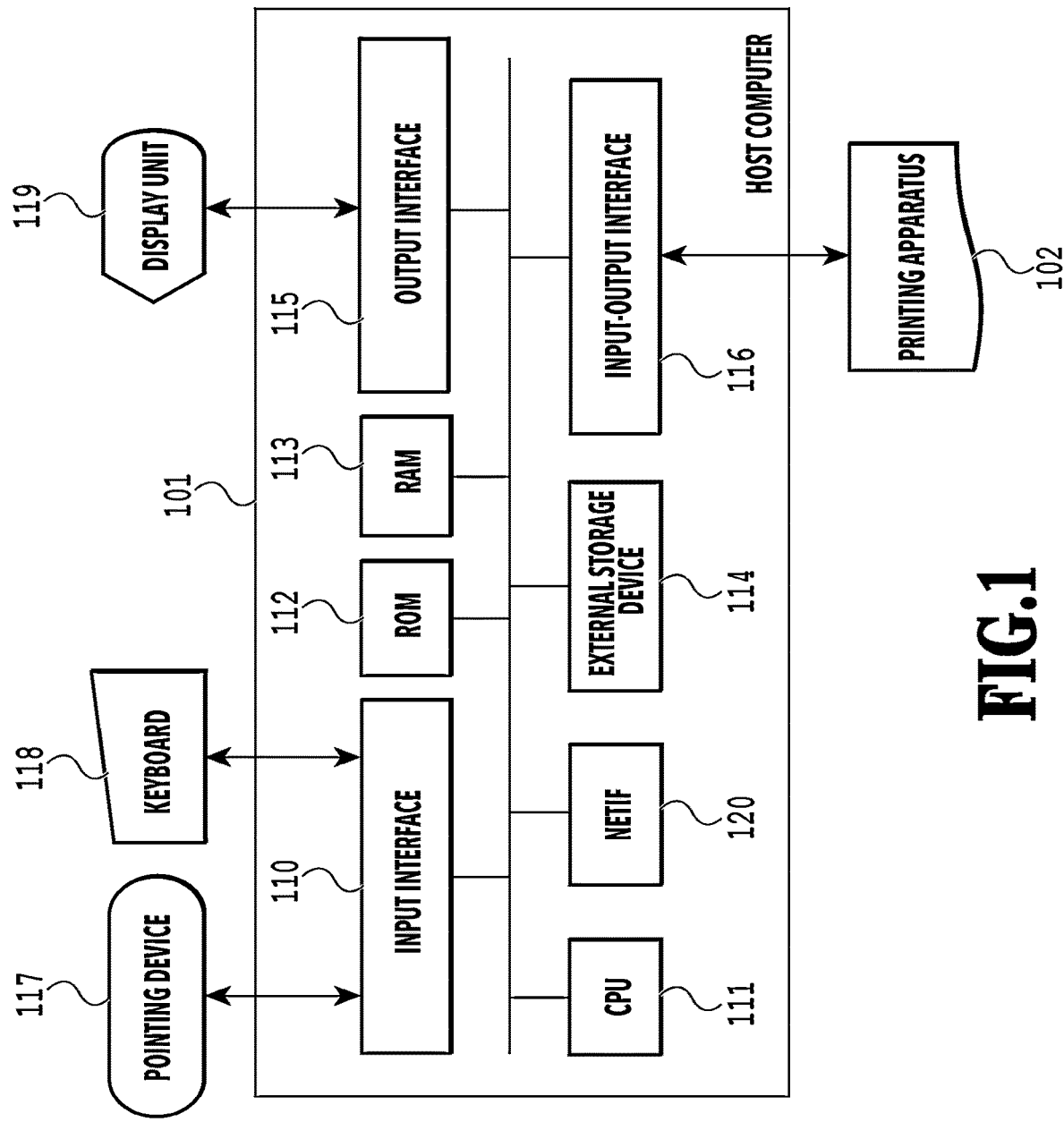
FIG. 1 is a block diagram illustrating a hardware configuration of a printing system.

Preferred embodiments of the present disclosure are described below in detail with reference to the appended drawings. The following embodiments are not intended to limit the matters of the present disclosure, and not all the combinations of the characteristics described in the present embodiments are necessarily required for the means for solving the problems. The same constituents are marked with the same reference numerals, and the descriptions are omitted.

First Embodiment

<Hardware Configuration of Printing System>

FIG. 1 is a block diagram illustrating a hardware configuration of a printing system in the present embodiment. The printing system includes a host computer 101, and FIG. 1 mainly illustrates a block configuration of the host computer. The host computer 101 is an example of an information processing apparatus. The host computer 101 includes an input interface 110, a CPU 111, a ROM 112, a RAM 113, an external storage device 114, an output interface 115, an input-output interface 116, and a network interface (NETIF) 120. The input interface 110 is connected with an input device such as a keyboard 118 and a pointing device 117, and the output interface 115 is connected with a display device such as a display unit 119. The NETIF 120 performs control to perform data transfer to and from an external device through a network. In the example in FIG. 1, the display unit 119, the pointing device 117, and the keyboard 118 are illustrated as an example of a device different from the host computer 101; however, the display unit 119, the pointing device 117, and the keyboard 118 may be included in the host computer 101. The display unit 119 may be a touch panel display having a function of an input and output device.

The ROM 112 stores an initialization program. The external storage device 114 stores a group of application programs, an operating system (OS), printing data generation software, and other various data. The OS in the descriptions below is an OS of the host computer 101 that is stored in the ROM 112 unless stated otherwise. Hereinafter, the application program is abbreviated to an application. The RAM 113 is used as a working memory or the like in a case of executing various programs stored in the external storage device 114; thus, the various programs are operable in the host computer 101.

In the present embodiment, with the CPU 111 performing processing according to a procedure of the program stored in the ROM 112, the later-described functions and processing of the host computer 101 are executed.

A printing apparatus 102 as an output device is connected with the host computer 101 through the input-output interface 116. In the example in FIG. 1, there is illustrated an example in which the host computer 101 and the printing apparatus 102 are separated from each other; however, the host computer 101 and the printing apparatus 102 may be formed as a single information processing apparatus. As an example of the printing apparatus, an inkjet printer that performs printing by discharging ink onto a paper surface is described; however, printing may be executed by another method (for example, an electrophotographic method). The host computer 101 may be a desktop personal computer, a smartphone, a tablet terminal, or a laptop personal computer. The input-output interface 116 may be wired or wireless. The host computer 101 and the printing apparatus 102 may be connected with each other through a LAN or a WAN such as the Internet.

<Configuration of Printing System Focused on Software>

Figure 2A:
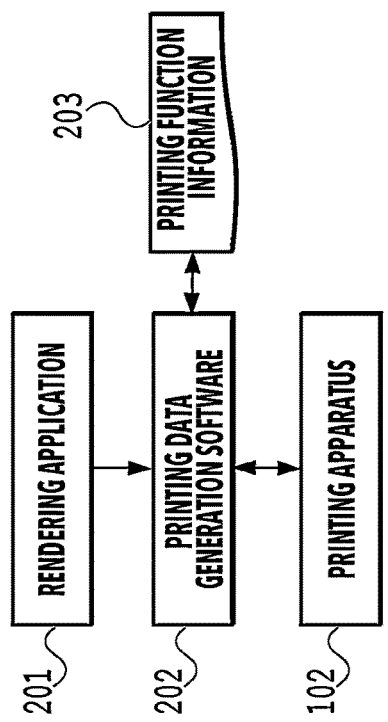
FIGS. 2A and 2B are diagrams schematically illustrating a configuration of the printing system.
Figure 2B:
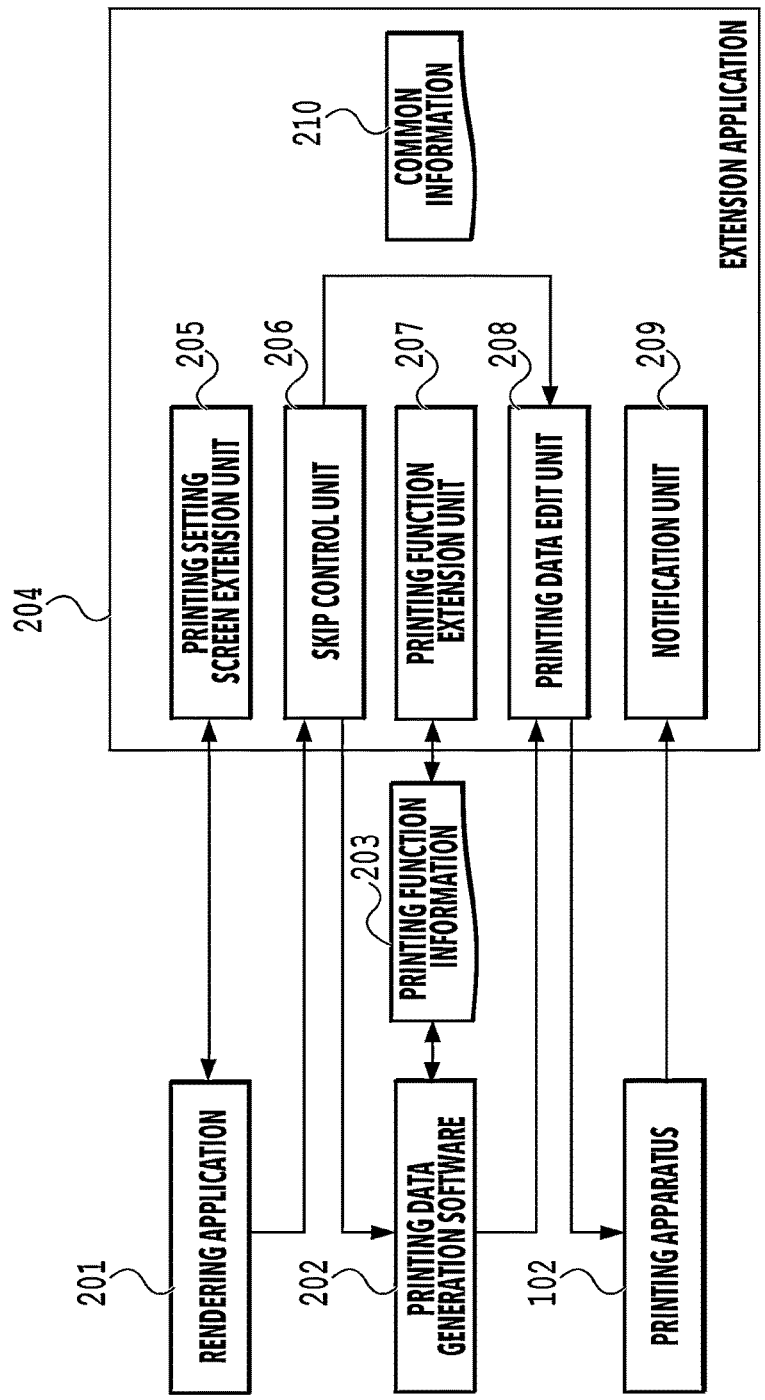

FIGS. 2A and 2B are diagrams schematically illustrating a configuration of the printing system. Here, descriptions are given assuming that the printing system uses the host computer 101 in which Windows (registered trademark) 10 from Microsoft (registered trademark) is installed as the OS. FIG. 2A is a diagram illustrating a general configuration in a case where an extension application 204 is not associated with printing data generation software 202 and the printing apparatus 102. That is, FIG. 2A is a diagram illustrating a configuration of a printing system in which the extension application 204 is not used. On the other hand, FIG. 2B is a diagram illustrating a configuration of the printing system of the present embodiment in which the extension application 204 is associated with the printing data generation software 202 and the printing apparatus 102.

First, an example of the printing system having a general configuration is described with reference to FIG. 2A. The printing system having a general configuration includes a rendering application 201 and the printing data generation software 202. Printing function information 203 is stored in the RAM 113 or the external storage device 114. The rendering application 201 and the printing data generation software 202 are programs operable by the host computer 101 and are stored in the RAM 113 or the external storage device 114.

The rendering application 201 is software that creates contents to be printed (rendering data). An example of the rendering application 201 includes various applications operated by a user such as a document creation application, a spreadsheet application, and a data creation application for presentation. Once receiving a printing request by accepting an operation by the user, the rendering application 201 issues a printing instruction to the OS. The printing instruction includes printing setting information for instructing operations of the printing data generation software 202 and the printing apparatus 102. The printing setting information is also referred to as PrintTicket (hereinafter, abbreviated to "PT").

The rendering application 201 can display a printing setting screen to accept a printing setting operation from the user and set the printing setting information (PT). The printing setting screen is a screen provided by either of the printing data generation software 202, the OS, and the rendering application 201. The printing setting screen includes a setting item (hereinafter, also referred to as a "control item") indicating a settable printing function and a control item indicating the setting value. The printing setting screen displays the control item in accordance with capability information (information settable as the printing setting) obtained from the printing data generation software 202. The capability information is also referred to as Print-Capabilities (hereinafter, abbreviated to "PC"). The printing data generation software 202 determines PC based on the printing function information 203.

The printing function information 203 is data indicating all the settable printing functions, setting values thereof, and a printing function in which the exclusive relationship between the setting values is described. The printing function information 203 is also referred to as PrintDeviceCapabilities (PDC). The printing function information 203 is included in a configuration file of the printing data generation software 202 and is arranged in the external storage device 114 as an unchangeable file. Otherwise, the printing function information 203 can also be dynamically generated by the printing data generation software 202. Specifically, the printing data generation software 202 or the OS can be configured to obtain attribute data of the printing apparatus from the printing apparatus 102 and generate the printing function information 203 in accordance with attribute information in the obtained attribute data. In a case where the printing function information 203 is dynamically generated, the generated printing function information 203 is editable. The attribute data of the printing apparatus obtained from the printing apparatus 102 is response data obtained by issuing a Get-Printer-Attributes operation of the IPP to the printing apparatus. The IPP is the Internet Print Protocol. The response includes the attribute information indicating a function that is able to be designated by the printing apparatus 102 (capability of the printing apparatus) and a setting value related to the attribute information. The response data is saved in the RAM 113.

With such a configuration, the printing data generation software 202 can be formed such that the user is able to designate the printing function usable in the corresponding printing apparatus 102 depending on the connected printing apparatus 102. In other words, the printing data generation software 202 can be formed such that the user is able to designate the usable printing function depending on the connected printing apparatus even in a case where a printing apparatus having a different function or a printing apparatus developed by a different vendor is connected. Here is described a configuration of using the IPP Class Driver installed in Windows (registered trademark) 10 as the printing data generation software 202. The IPP Class Driver is a printer driver that executes printing processing in accordance with the specification of a standard printing protocol called the IPP and is software that is bundled with the OS and pre-installed in the host computer 101. The IPP Class Driver is not a specific printer driver that is provided by the vendor of the printing apparatus 102 depending on the model of the printing apparatus 102. The IPP Class Driver is usable in common for multiple printing apparatuses and is a standard class driver provided by the vendor of the OS. The IPP Class Driver obtains the attribute information on the connected printing apparatus 102 and generates the printing function information 203 based on the information such that the user can designate the printing function supported by the connected printing apparatus 102. Thus, the IPP Class Driver as the printing data generation software 202 can dynamically generate the printing function information 203 (PDC).

The printing setting information (PT) designated through the printing setting screen displayed based on PC (Print Capability) based on the printing function information 203 (PDC) as described above is included in the printing instruction outputted from the rendering application 201. In addition to the printing setting information (PT), the printing instruction outputted from the rendering application 201 also includes data that should be rendered.

The OS generates intermediate data (also referred to as input data) based on the printing instruction outputted from the rendering application 201 and passes the intermediate data to the printing data generation software 202. The data outputted by the rendering application 201 for printing is data in the Graphic Device Interface format (data in the GDI format) or data in the XML Paper Specification format (data in the XPS format). In a case where the IPP Class Driver is used as the printing data generation software 202, if the data outputted by the rendering application 201 is data in the GDI format, the OS converts the data format. In other words, the OS converts the data in the GDI format that is outputted from the rendering application 201 into the data in the XPS format. The OS then passes the converted data in the XPS format to the printing data generation software 202 as the intermediate data. On the other hand, if the data outputted by the rendering application 201 is the data in the XPS format, the OS passes the data in the XPS format to the printing data generation software 202 as the intermediate data. The intermediate data includes the rendering data, which is information on an image to be formed on the paper surface, and the printing setting information (PT) set by the user.

The printing data generation software 202 converts the obtained intermediate data into printing data that the printing apparatus 102 is able to construe and transmits the printing data to the printing apparatus 102. The printing data includes the rendering data, which is the information on the image to be formed on the paper surface, and printing setting attribute information (attribute information designating the printing setting), which is generated based on the printing setting information set by the user. The printing setting attribute information includes the attribute information indicating the function that is able to be designated by the printing apparatus 102 (capability of the printing apparatus) and the setting value related to the attribute information.

The printing apparatus 102 performs printing on the paper surface based on the printing data transmitted from the printing data generation software 202. In this process, the printing apparatus 102 forms an image according to the rendering data included in the printing data on the paper surface through an operation in accordance with the printing setting attribute information included in the printing data. The printing setting attribute information includes printing quality (whether to give priority to image quality or to speed, for example), the attribute information and a setting value thereof for designating double-sided printing or the like, and so on. For example, in a case where the printing setting attribute information includes the attribute information designating double-sided printing, the printing apparatus 102 executes double-sided printing.

FIG. 2B is a diagram illustrating a configuration of the present embodiment in a case where the extension application 204 is associated with the printing data generation software 202 and the printing apparatus 102. The configurations and processing that are not particularly mentioned below are equivalent to the configurations and processing in FIG. 2A. In the following descriptions, the processing that is described as being executed by each software included in the host computer 101 is implemented in reality as follows. In other words, the processing is implemented by the CPU 111 developing and executing each software saved in the ROM 112 or the like in the RAM 113.

The extension application 204 is software for extending the function of the printing data generation software 202 and is software that is not the software bundled with the OS and pre-installed in the host computer 101. For this reason, the user downloads the extension application 204 from a server through the Internet and installs into the host computer 101 by operating the host computer 101. Otherwise, based on the connection of the printing apparatus 102 with the host computer 101, the extension application 204 may be automatically installed into the host computer 101. Specifically, in a case where the printing apparatus 102 is connected to the host computer 101, the OS obtains device identification information from the printing apparatus 102. The OS may download the extension application 204 corresponding to the obtained device identification information from the server through the Internet to install into the host computer 101. Thus, the printing data generation software 202 and the extension application 204 are held in the host computer 101 as different files.

The printing data generation software 202 and the extension application 204 may be updated for version upgrades, and the update processing is performed in different timings. A timing in which the printing data generation software 202 is obtained by the host computer 101 and a timing in which the extension application 204 is obtained are different. Also, a trigger with which the printing data generation software 202 is obtained by the host computer 101 and a trigger with which the extension application 204 is obtained are different. In a case where the extension application 204 is installed, the OS associates the extension application 204 with the printing data generation software 202 and the corresponding printing apparatus 102.

The extension application 204 described in the present embodiment includes a printing setting screen extension unit 205, a skip control unit 206, a printing function extension unit 207, a printing data edit unit 208, and a notification unit 209. The extension application 204 also includes common information 210 that is accessible in common from each unit. The extension application 204 is provided by the vendor providing the printing apparatus 102. The reality of the common information 210 is a file saved in the external storage device 114 or information stored on the RAM 113.

The extension application 204 performs writing and reading of information to and from the common information 210 by using an Application Program Interface (API) provided by the OS.

The extension application 204 may end the operation every time processing of each unit ends. In this case, the OS activates the extension application 204 every time a request of using each unit is received. A different mode may be considered. For example, although the OS ends the operation of the extension application 204 in a case where processing of the printing setting screen extension unit 205 ends, the OS may keep the extension application 204 working in a case where processing of the skip control unit 206 ends.

Additionally, in the middle of processing of each unit, the extension application 204 may cancel the processing. In a case where the extension application 204 cancels the processing, a job in the middle of processing on a printing queue is deleted by the OS. The printing queue is a spooler included in the OS to store a generated job. The job is generated based on an output of the printing instruction from the extension application 204 and stored in the printing queue. The intermediate data generated based on the output of the printing instruction from the extension application 204 is data associated with the job that is stored in this process. In a case where the intermediate data associated with the job is in the middle of processing, the status of the job is also in the middle of processing. With the printing data, which is obtained by converting the intermediate data associated with the job (in other words, printing data associated with the job), being transmitted to the printing apparatus 102, the job is deleted from the printing queue by the OS.

Once receiving the printing request from the user, the rendering application 201 issues the printing instruction to the OS. As with the configuration in FIG. 2A, the printing instruction includes the printing setting information (PT). As with the configuration in FIG. 2A, the rendering application 201 can display the printing setting screen for designating the printing setting information (PT) under the configuration in FIG. 2B as well. Under the configuration in FIG. 2B, the printing setting screen provided by the extension application 204 is displayed. Specifically, the printing setting screen provided by the printing setting screen extension unit 205 included in the extension application 204 is displayed. In other words, display control of the printing setting screen by the printing setting screen extension unit 205 is performed. Whether the printing setting screen provided by the printing setting screen extension unit 205 is displayed depends on an operation by the user.

Once the rendering application 201 accepts the printing request from the user and the printing instruction is issued to the OS, the OS activates the skip control unit 206. The skip control unit 206 performs processing of controlling whether to perform skip processing for skipping processing of the printing data generation software 202. The skip control unit 206 cannot obtain the intermediate data and the printing setting information. After the skip control processing (skip determination processing) of the skip control unit 206, the OS generates the intermediate data based on the printing instruction outputted from the rendering application 201 and passes the intermediate data to the printing data generation software 202. In this process, if no skip processing is preformed by the skip control unit 206, the intermediate data is processed by the printing data generation software 202 into the printing data that the printing apparatus 102 is able to construe and passed to the printing data edit unit 208. On the other hand, if the skip processing of the printing data generation software 202 is performed, the intermediate data is passed to the printing data edit unit 208 without being processed by the printing data generation software 202. Thus, it is possible to process the intermediate data by the printing data edit unit 208.

An example of a case where it is preferable to skip the processing of the printing data generation software 202 may include a case where scaling processing is desired to be performed by the printing data edit unit 208. The intermediate data is capable of holding data in a vector format. The data in the vector format has less deterioration than that in data in a raster format in a case of scaling. For this reason, in a mode in which the printing data generation software 202 outputs an image in the raster format, in general, it is preferable to skip the processing of the printing data generation software 202 and the intermediate data is processed by the printing data edit unit 208.

The printing data edit unit 208 edits the intermediate data passed from the printing data generation software 202 or the printing data processed by the printing data generation software 202. For example, as details of the editing, in a case of the layout printing, the printing data edit unit 208 changes the layout of the intermediate data or the printing data based on the printing setting information on the layout printing that is received from the OS. The layout printing is, for example, printing that is performed with data of N pages being laid out on one page, and is called N-in-one, N-up, or the like (N indicates the number of pages). The printing data edit unit 208 is capable of executing a UI display function to display a UI screen on the display unit 119 in response to the reception of the intermediate data or the printing data from the printing data generation software 202 or the skip control unit 206. For example, the printing data edit unit 208 can display a layout result of the intermediate data or the printing data as a preview screen by the UI display function. After the printing data edit unit 208 edits the printing data, the printing data is passed to the printing apparatus 102 by way of the OS. The printing apparatus 102 performs printing on the paper surface based on the received printing data. In a case where the printing data generation software 202 is skipped by the skip control unit 206, the printing data edit unit 208 may convert the received intermediate data into printing data that the printing apparatus 102 is able to construe.

The extension application 204 includes the printing function extension unit 207. The printing function extension unit 207 can edit the printing function information 203 (PDC) generated by the printing data generation software 202 or the OS. That is, the printing function extension unit 207 is capable of changing the printing function information 203 even if the printing function information 203 is arranged in the external storage device 114 as an unchangeable file. Thus, the extension application 204 has a function of editing the printing function information 203 (PDC). The printing function extension unit 207 is capable of adding a function provided by the extension application 204. The printing function extension unit 207 can add a function that is supported by the printing apparatus 102 but is not supported by the printing data generation software 202 and can add the exclusive relationship between the setting values of the printing function, for example.

The OS activates the printing function extension unit 207 once the extension application 204 is associated with the printing apparatus 102 and the printing data generation software 202 for the first time. Additionally, the OS may activate the printing function extension unit 207 in another arbitrary timing such as activation of the OS. Thus, in a case where an optional device (for example, a finisher or the like) is added to the printing apparatus 102 later and a function related to the printing is extended, the printing function extension unit 207 can detect the extended function and add the extended function to the printing function information 203.

The extension application 204 includes the notification unit 209. The notification unit 209 is capable of displaying a notification to the user in response to occurrence of an error in the printing apparatus 102. For example, once an error of no paper occurs in the printing apparatus 102, the error is detected by the printing data generation software 202. The OS then displays a message on the display unit 119 by using a notification function called a toast notification that is a function of the OS. With the user pressing the toast notification, the notification unit 209 of the extension application 204 is called by the OS, and a UI screen of the notification unit 209 is displayed. In the UI screen of the notification unit 209, for example, a message indicating details of the error of no paper, a method of loading paper, or the like can be displayed. Pressing includes not only a click operation of a mouse and the like but also a touch or tap operation in a touch panel display.

The configuration of the extension application 204 for implementing the present embodiment is not limited to that having all the above-described functions (units), and a configuration having only a part of the functions or having another function may be applicable. The extension application 204 may be simply called printing software in some cases. As described above, the extension application 204 includes at least one of the following functions. The functions are a function of displaying the printing setting screen (the printing setting screen extension unit 205) and a function of controlling whether to skip the processing of the printing data generation software 202 (the skip control unit 206). The functions also include a function of editing the printing data to be inputted to the printing apparatus (the printing data edit unit 208) and a function of extending the function that is able to be designated by the printing data generation software 202 (the printing function extension unit 207). The functions also include a function of displaying the screen in response to the occurrence of an error in the printing apparatus 102 (the notification unit 209).

<Format of Data Treated by Each Part of Printing System>

The printing data generation software 202 obtains the capability information (PC) from the printing apparatus 102 and determines the format of the printing data that is supported by the printing apparatus 102. This allows the printing data generation software 202 to generate the printing data that the printing apparatus 102 is able to construe. A part described as the format of the printing data hereinbelow may indicate in reality the format of the rendering data included in the printing data.

Figure 3A:
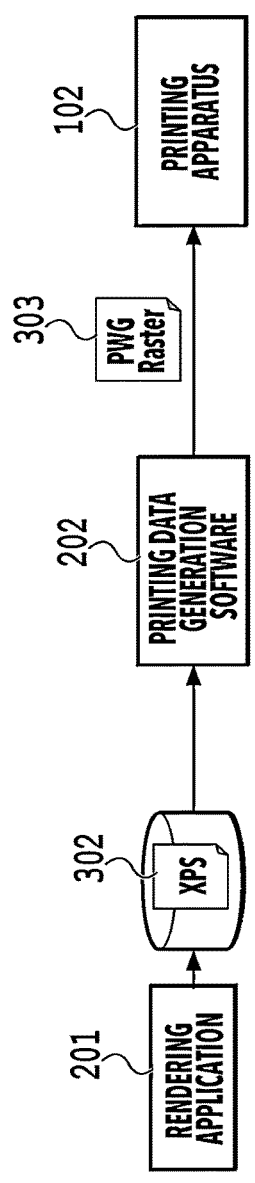
FIGS. 3A to 3C are diagrams illustrating a format of data treated by each part of the printing system.
Figure 3B:
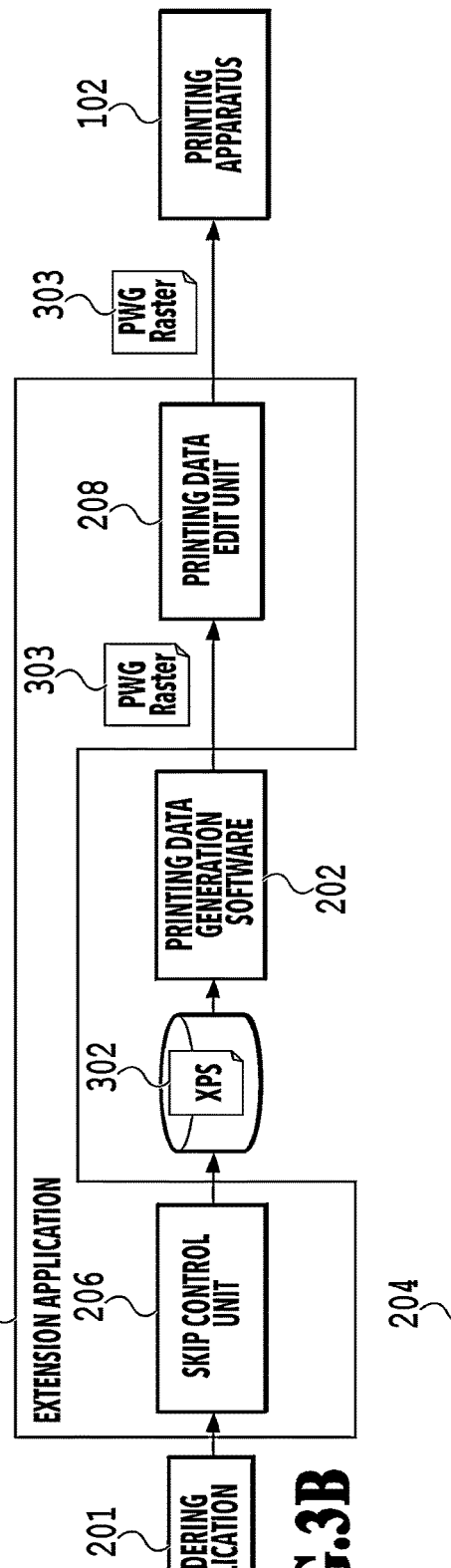
Figure 3C:
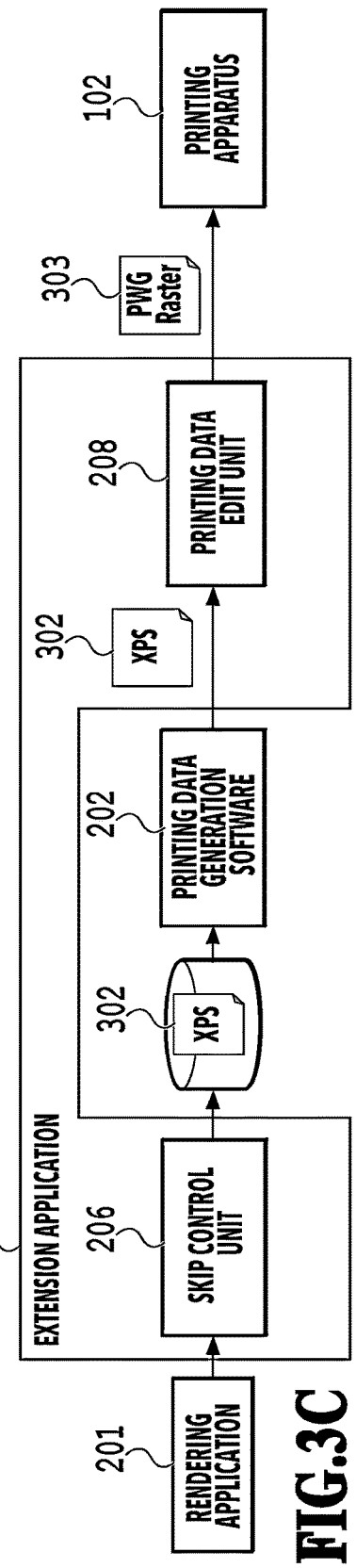

FIGS. 3A to 3C are diagrams illustrating a format of data treated by each part of the printing system of the present embodiment. FIG. 3A is a diagram illustrating a data format treated by each part of the printing system in a case where the extension application 204 is not associated. Once receiving the printing instruction from the rendering application 201, the OS generates XPS data 302 that is the intermediate data. As described above, in a case where the data from the rendering application 201 is the GDI data, the OS generates the XPS data 302 by converting the GDI data. In a case where the data from the rendering application 201 is the XPS data 302, the OS passes the XPS data 302 to the printing data generation software 202.

The printing data generation software 202 converts the XPS data 302 into the printing data that the printer is able to construe. The printing data generation software 202 determines the format of the printing data that is supported by the printing apparatus 102 from the attribute data obtained from the printing apparatus 102 and generates the printing data that the printing apparatus 102 as a processing target is able to construe. It may be considered that the format of the printing data is PDF, PWG Raster, or the like; however, it is not limited thereto. In the present embodiment, PWG Raster is used as the format of the printing data that is supported by the printing apparatus 102. Thus, the printing data generation software 202 converts the XPS data 302 into PWG Raster data 303 and transmits the PWG Raster data 303 to the printing apparatus 102. The printing apparatus 102 performs printing based on the received PWG Raster data 303.

FIG. 3B is a diagram illustrating a format of the data that is treated in a case where the extension application 204 is associated and also the skip processing in which the printing data generation processing by the printing data generation software 202 is skipped is not performed. Once receiving the printing instruction from the rendering application 201, the OS calls the skip control unit 206 of the extension application 204. However, in FIG. 3B, the skip control unit 206 does not perform the skip processing in which the processing of the printing data generation software 202 is skipped. For this reason, the OS passes the XPS data 302 to the printing data generation software 202 as with the case in FIG. 3A. The printing data generation software 202 converts the XPS data 302 to the PWG Raster data 303. The printing data edit unit 208 receives the PWG Raster data 303 as the input data. The PWG Raster data 303 is the printing data that the printing apparatus 102 is able to construe. Accordingly, the printing data edit unit 208 transmits the PWG Raster data 303 as the input data to the printing apparatus 102 without conversion. The printing apparatus 102 performs printing based on the received PWG Raster data 303.

FIG. 3C is a diagram illustrating a format of the data that is treated in a case where the extension application 204 is associated and also the skip processing in which the printing data generation processing by the printing data generation software 202 is skipped is performed. Once receiving the printing instruction from the rendering application 201, the OS calls the skip control unit 206 of the extension application 204. The skip control unit 206 performs the skip processing in which an instruction is provided to the OS or the printing data generation software 202 so as not to execute the conversion processing from the intermediate data into the printing data. In a case where the skip control unit 206 provides the skip instruction to the OS, the OS provides an instruction to the printing data generation software 202 so as not to execute the conversion processing. Once the printing data generation software 202 receives the skip instruction from the skip control unit 206, the printing data generation software 202 passes the intermediate data to the printing data edit unit 208 of the extension application 204 without conversion into the printing data. Alternatively, the OS may pass the intermediate data directly to the printing data edit unit 208 of the extension application 204 without the printing data generation software 202. After necessary edition of the XPS data based on the printing setting information, the printing data edit unit 208 converts the XPS data into the PWG Raster data 303 and transmits the PWG Raster data 303 to the printing apparatus 102. The printing apparatus 102 performs printing based on the received data. In a case where the format of the printing data that the printing apparatus 102 is able to construe includes XPS, the printing data edit unit 208 is able to transmit the XPS data to the printing apparatus 102 and perform printing without conversion into another format.

<Edit Processing of Printing Function Information by Printing Function Extension Unit>

Figure 4:
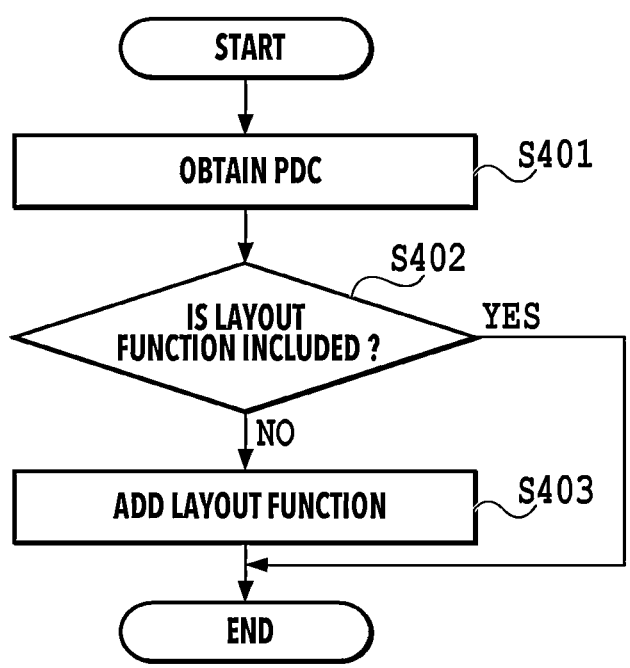
FIG. 4 is a flowchart illustrating an example of edit processing of printing function information.

FIG. 4 is a diagram illustrating a main processing flow of edit processing of the printing function information 203 by the printing function extension unit 207 in the present printing system. Hereinafter, the printing function extension unit 207 may be described as a unit having a central role in each processing; however, in reality, a corresponding function is implemented by the CPU 111 executing a corresponding program.

The flow in FIG. 4 is started with the OS activating the printing function extension unit 207 in a timing in which the extension application 204 is associated for the first time, for example. Alternatively, the processing in FIG. 4 may be executed in another arbitrary timing. In S401, the printing function extension unit 207 obtains the printing function information 203 (PDC) from the printing data generation software 202, and the processing proceeds to S402. In S402, the printing function extension unit 207 determines whether the obtained PDC includes a description related to a layout function.

FIG. 5 is a diagram illustrating an example of PDC. PDC 501 includes information on the function (Feature) supported by the printing apparatus 102 and information on a setting value (Option) in a function. For example, information 502 indicates that ISOA4 and NorthAmericaLetter are settable as PageMediaSize (paper size). Information 503 indicates that Plain (plain paper) and Photographic (photo paper) are settable as PageMediaType (paper type). Information 504 indicates that Portrait (vertical) and Landscape (horizontal) are settable as PageOrientation (printing direction). PDC in FIG. 5 does not include information indicating that the layout function is settable.

Referring back to FIG. 4, and the description is continued. If it is determined that the obtained PDC includes the description related to the layout function, the printing function extension unit 207 does not edit PDC and withdraws from the present processing flow. If it is determined in S402 that PDC does not include the description related to the layout function, the processing by the printing function extension unit 207 proceeds to S403. In S403, the printing function extension unit 207 writes Feature and Option related to the layout function into the obtained PDC and withdraws from the present processing flow.

Here is described a reason why the printing function extension unit 207 adds the layout function to PDC in the present embodiment. In a case where the printing apparatus 102 supports the layout function, PDC already includes the description of the layout function; for this reason, the layout function does not need to be added (it is determined to be YES in S402). In the present embodiment, as described later, it is possible to execute the layout processing in the form in which the deterioration of the image quality is suppressed by the edit processing in the printing data edit unit 208. Thus, even in a case where the printing apparatus 102 does not support the layout function for instance, it is possible to execute the layout function by the extension application 204. Therefore, in order to define that it is possible to execute the layout function, the processing of adding the layout function to PDC is performed in S403 if the printing apparatus 102 does not support the layout function in S402.

In the present embodiment, the layout function is described as an example of the extended function performed by the extension application 204; however, it is not limited thereto. For example, a scaling function that performs printing while the rendering data is enlarged or reduced at an arbitrary magnification, a division function that divides the rendering data of one page to be printed on multiple paper surfaces, and the like also fall into the extended function applied in the present embodiment. In other words, although the layout function is described as an example of a specific function in S402, it is not limited thereto. The specific function is a function that causes the deterioration of the image quality of a printed product more in a case where the function is executed with raster data than a case where the function is executed with vector data. Specifically, the specific function is the layout processing including scaling, and in addition to the layout function, the scaling function, the division function that divides the rendering data of one page, and the like may be included as described above. In the present embodiment, descriptions are given using the layout function as an example of such a specific function.

FIG. 6 is a diagram illustrating an example of PDC to which the function is added as a result of the edition in the flowchart in FIG. 4. With the processing in S403, information 602 indicating the layout function is added to PDC 601 after the edition. The information 602 indicates that any one of the following is settable as JobNUpAllDocumentsContiguously (layout setting). In other words, the information 602 indicates that None (the layout function is not used), PagesPerSheet_2 (2 in 1), or PagesPerSheet_4 (4 in 1) is settable.

FIG. 7 is a diagram illustrating an example of the capability information (PC) generated based on PDC in FIG. 6. As with PDC, PC includes information on the function (Feature) usable by the printing data generation software 202 and information on the setting value (Option) in a function. In PC 701, based on the function information described in the PDC 601, there is indicated that the paper size (PageMediaSize), the paper type (PageMediaType), and the printing direction (PageOrientation) are settable. In the PC 701, there is indicated that the layout function (JobNUpAllDocumentsContiguously) added by the extension application 204 is settable. The printing setting screen extension unit 205 or an application that provides a unique printing setting screen can provide a printing setting screen with reference to the PC 701. In other words, it is possible to provide a printing setting screen including the setting of the added layout function.

With the above, Feature and Option related to the layout function are added to PrintCapabilities (PC) that is the capability information generated based on PDC that is the printing function information 203 and PrintTicket (PT) indicating the printing setting.

Thus, the function added to the printing function information 203 (PDC) is reflected on the capability information (PC) and the printing setting information (PT) and recognized as valid setting. A function that is not included in PDC is determined as invalid setting. For example, in a case where the function that is not included in PDC is included in the printing setting information (PT), the setting may be canceled in a case where validation processing of the printing setting information (PT) is performed. For this reason, in the present embodiment, the layout function that is desired to be treated in the printing setting is added to the printing function information 203 (PDC) in the flowchart in FIG. 4.

<Printing Setting Screen Display Processing by Printing Setting Screen Extension Unit>

Figure 8:
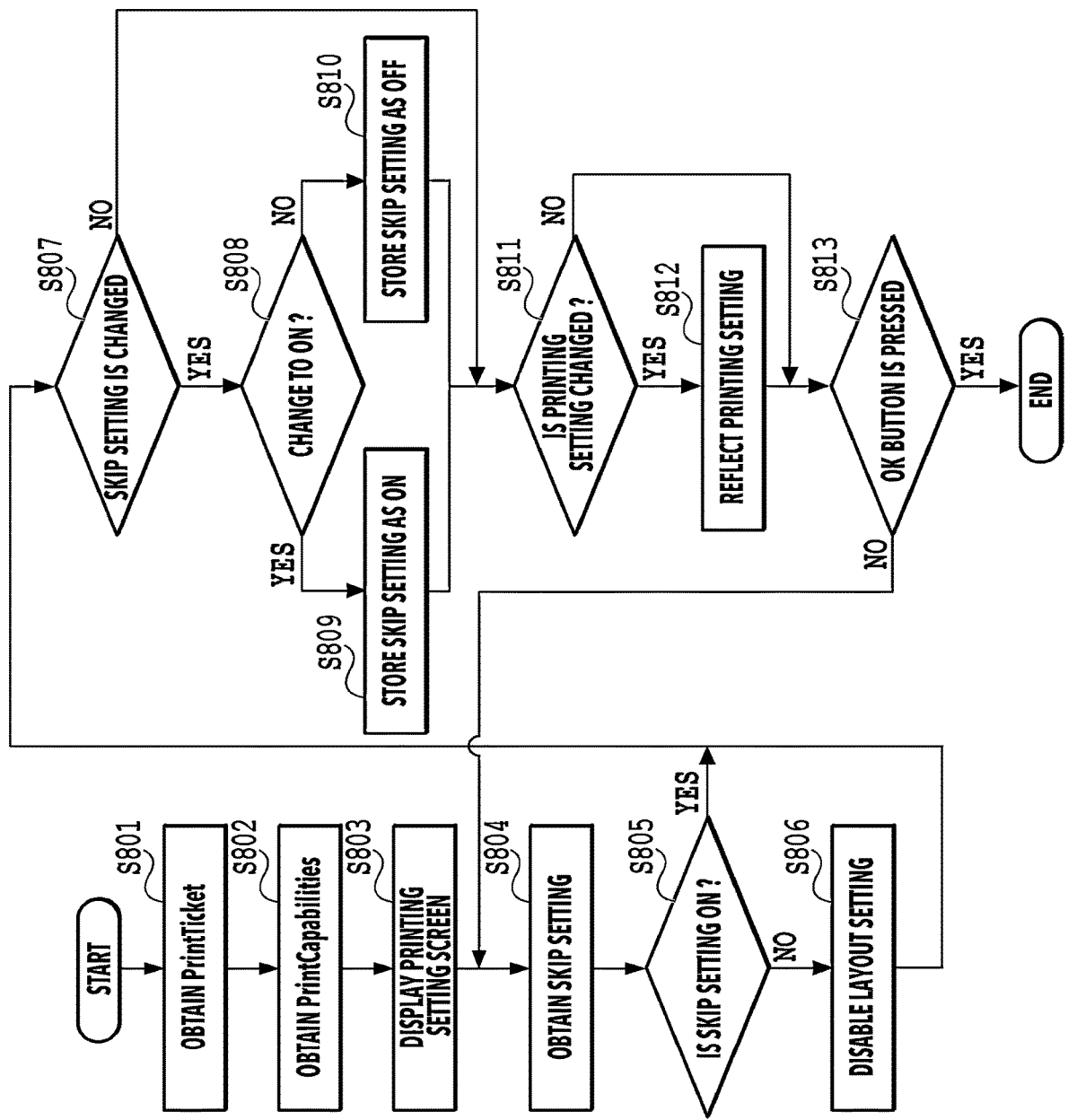
FIG. 8 is a flowchart illustrating an example of printing setting screen display processing.

The printing setting screen extension unit 205 is called through the OS in a case where the user instructs displaying of the printing setting screen on the rendering application 201. FIG. 8 is a flowchart illustrating an example of printing setting screen display processing by the printing setting screen extension unit 205. Hereinafter, the printing setting screen extension unit 205 may be described as a unit having a central role in each processing; however, in reality, a corresponding function is implemented by the CPU 111 executing a corresponding program.

First, in S801, the printing setting screen extension unit 205 obtains PrintTicket (PT) that is the printing setting information. PT that is obtained in this process is a default value. Next, in S802, the printing setting screen extension unit 205 obtains PrintCapabilities (PC) that is the capability information. In S803, the printing setting screen extension unit 205 displays the printing setting screen based on PT obtained in S801 and PC obtained in S802.

Figure 9A:
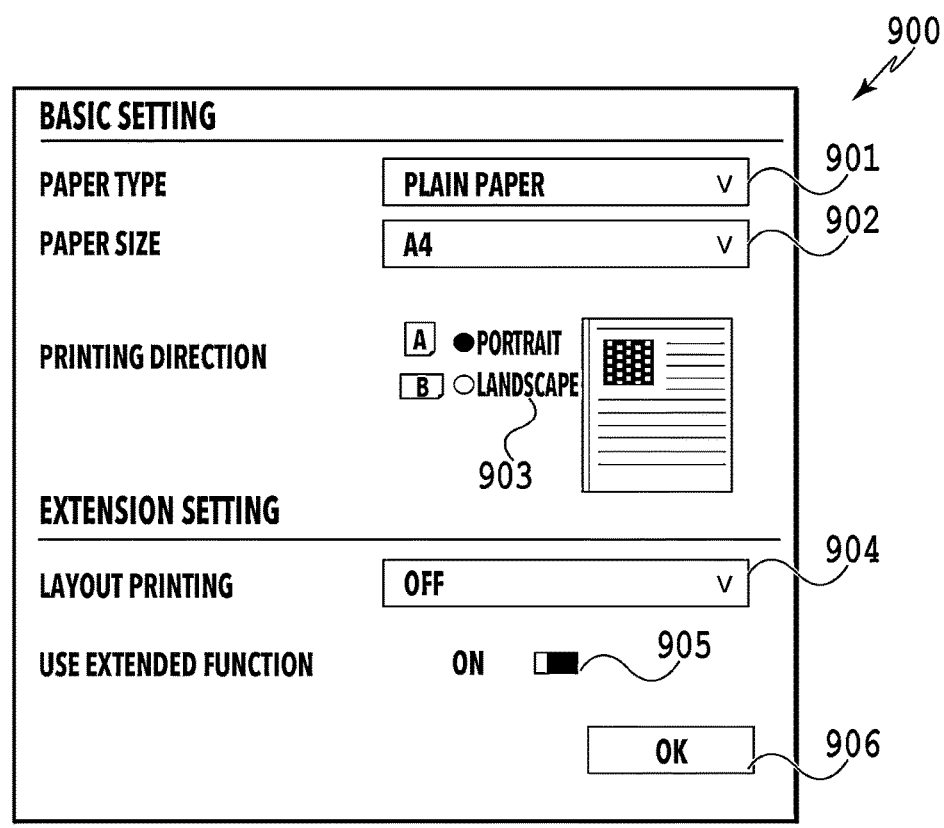
FIGS. 9A and 9B are diagrams illustrating an example of a printing setting screen.
Figure 9B:
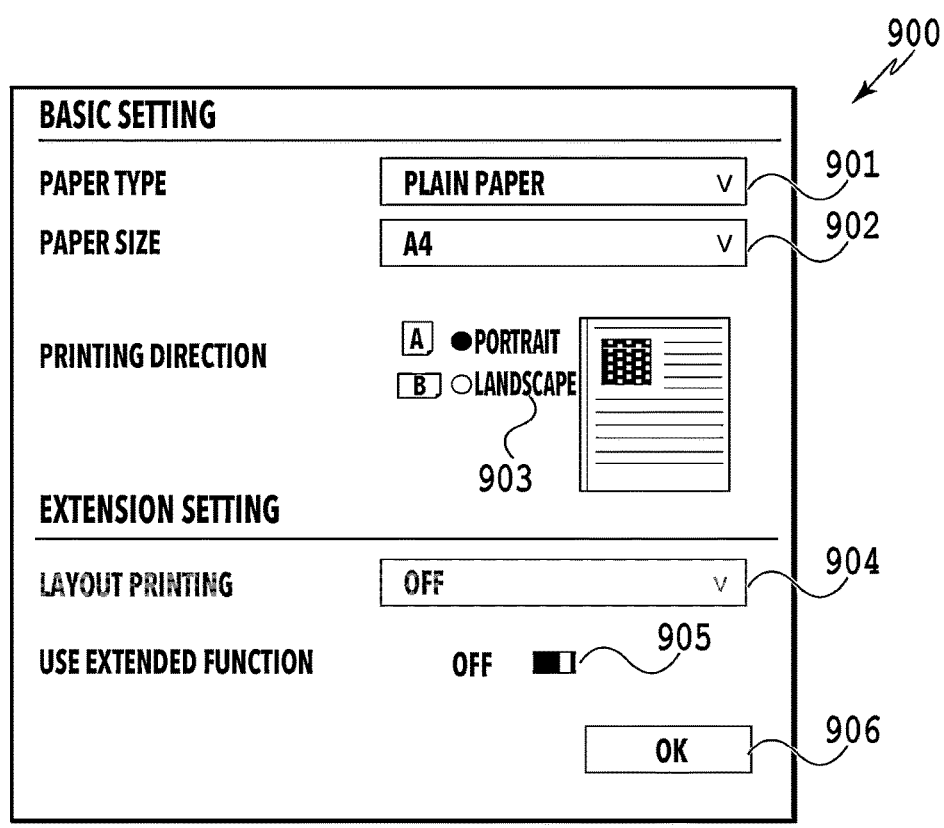

FIGS. 9A and 9B are diagrams illustrating an example of the printing setting screen displayed by the printing setting screen extension unit 205. FIG. 9A is a diagram illustrating an example of the printing setting screen in a case where the skip setting is set to ON. A printing setting screen 900 displayed by the printing setting screen extension unit 205 is a screen that allows for designation of the printing function that is settable by the printing data generation software 202 based on the above-described PC. A control item 901 to a control item 904 are control items for the user to set each printing function. The control item 901 is a control item through which the type of paper used for printing is settable and, for example, it is possible to set an item such as plain paper or photo paper. The control item 902 is a control item through which the size of paper used for printing is settable and, for example, it is possible to set an item such as A4 or Letter. The control item 903 is a control item through which the printing direction is settable and it is possible to set to portrait or landscape. The control item 904 is a control item through which the layout function is settable, and it is possible to set an item such as off or 2 in 1. The control item 904 is a control item that is displayed by PC that is generated based on PDC to which the printing function extension unit 207 adds the information on the layout function.

A control item 905 is a control item through which whether to use the extended function is switched. In other words, the control item 905 is a control item through which whether to skip the conversion processing by the printing data generation software 202 from the intermediate data into the printing data is settable, and it is possible to switch between ON and OFF. The control item 905 is an item that is able to be switched by the user, and in an initial screen, a value in accordance with the default value of PT that is obtained in S901 is set. In the present embodiment, a state where the skip setting of the control item 905 is set to on (in other words, a state where a use of the extended function is set) is the default value. The printing setting screen extension unit 205 stores the setting value indicating the skip setting into the common information 210 in accordance with the setting of the control item 905. A control item 906 is an OK button that reflects the setting and closes the screen.

Referring back to FIG. 8, and the description is continued. In S804, the printing setting screen extension unit 205 obtains the skip setting from the common information 210. The skip setting is described later with reference to FIG. 10. In a case where the processing of the printing data generation software 202 is skipped, the setting value of the skip setting is stored in the ON state, and in a case where the skipping is not performed, the setting value of the skip setting is stored in the OFF state. Next, in S805, the printing setting screen extension unit 205 determines whether the skip setting obtained in S804 is ON. If it is determined that the skip setting is ON, the processing proceeds to S807, and if it is determined that the skip setting is OFF, the processing proceeds to S806. In the present embodiment, the layout function is usable in a case where the processing of the printing data generation software 202 is skipped. For this reason, if it is determined in S805 that the skip setting is OFF, the printing setting screen extension unit 205 disables the control item 904 through which the layout function is set, and the setting of the layout function is set to off in S806.

FIG. 9B is a diagram illustrating the printing setting screen in a case where the skip setting is set to OFF. In a case where the skip setting is OFF, in S806, the printing setting screen extension unit 205 disables the control item 904 through which the layout function is set. With this, the user cannot set the layout function, and the setting of the layout function is OFF constantly.

The control item as the disabling target in a case where the skip setting is OFF is determined as follows. A first determination method is a determination method based on a list of the control items as the disabling target. The printing setting screen extension unit 205 can statically hold a list of functions that should be disabled in a case where the skipping is not performed out of the functions added by the printing function extension unit 207. The printing setting screen extension unit 205 then determines the control items as the disabling target based on the list. A second determination method is a method in which the printing function extension unit 207 shares with the printing setting screen extension unit 205 information on whether the printing function extension unit 207 itself adds the function. The printing setting screen extension unit 205 determines the control item as the disabling target based on the information from the printing function extension unit 207. In the present embodiment, with any one of the methods, the printing setting screen extension unit 205 determines that the control item as the disabling target is the control item 904 through which the layout function is set, and the disabling processing is performed.

In the present embodiment, the layout setting is allowed only in a case where the skip setting is ON; however, it is not limited thereto. In a case where the printing data generation software 202 supports the layout function, it is preferable to allow for the setting of the layout function even if the skip setting is OFF. In this case, the layout processing is not executed by the extension application 204 but the printing data generation software 202. The determination on whether the printing data generation software 202 supports the layout function may be made as follows. For example, it may be determined that the printing data generation software 202 supports the layout function if it is determined in S402 that PDC includes the layout function in a case where the extension application 204 executes the flow in FIG. 4 for the first time. In a case where the printing data generation software 202 supports the layout, the control item 904 does not need to be disabled, and thus a configuration that allows for the setting of the layout function using the printing setting screen 900 may be applicable. After S806, the processing proceeds to S807.

S807 to S813 are processing performed in response to operations performed by the user on the printing setting screen. In S807, the printing setting screen extension unit 205 determines whether the user changes the skip setting through the control item 905. If it is determined in S807 that the skip setting is changed, the processing by the printing setting screen extension unit 205 proceeds to S808. If it is determined in S807 that the skip setting is not changed, the processing by the printing setting screen extension unit 205 proceeds to S811.

In S808, the printing setting screen extension unit 205 determines whether the skip setting is changed to be ON. If it is determined in S808 that the skip setting is changed to be ON, the processing by the printing setting screen extension unit 205 proceeds to S809, and the setting value of the skip setting in the common information 210 is stored as ON. In S809, processing of enabling the disabled layout function is performed. Thereafter, the processing proceeds to S811. If it is determined in S808 that the skip setting is not changed to be ON, the processing by the printing setting screen extension unit 205 proceeds to S810, and the setting value of the skip setting in the common information 210 is stored as OFF. Thereafter, the processing proceeds to S811.

Figure 10:
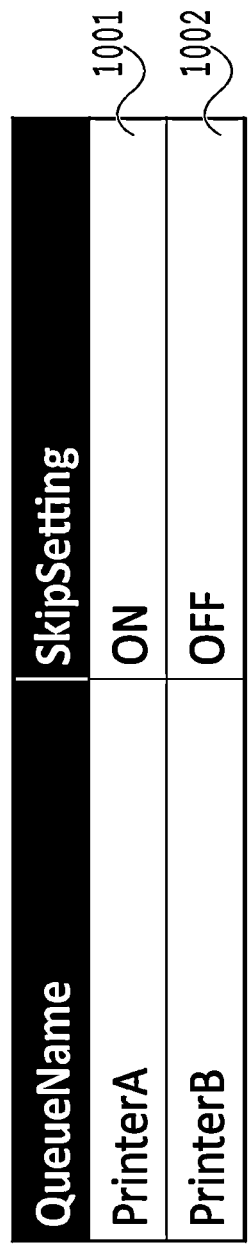
FIG. 10 is a diagram illustrating an example of skip setting.

FIG. 10 is a diagram illustrating an example of the setting value of the skip setting that is stored in the common information 210 and is used for the determination on whether to skip the processing of the printing data generation software 202. The extension application 204 operates in association with the printing data generation software 202. To be more specific, the extension application 204 is associated with the printing queue generated for each printing apparatus. The printing queue is a queue for populating the printing data. The printing queue is generated for each connected printing apparatus. Even in the same printing apparatus, if the printing apparatus is connected with different methods such as USB connection or network connection, different printing queues are generated, respectively. It is desirable that the extension application 204 has settings for each printing queue. Thus, the skip setting (SkipSetting) is saved in association with information identifying the printing queue on which setting is made. In the present embodiment, a printing queue name (QueueName) is used as the information identifying the printing queue; however, it is not limited thereto, and an ID or the like that uniquely identifies the printing queue may be used.

In a case of printing for a printing queue having a name of PrinterA, information 1001 is information indicating that the skip control unit 206 performs the skip processing (the setting value of the skip setting is ON). In a case of printing for a printing queue having a name of PrinterB, information 1002 is information indicating that the skip control unit 206 does not perform the skip processing (the setting value of the skip setting is OFF). The setting value of the skip setting is changed through the control item 905.

Referring back to FIG. 8, and the description is continued. In S811, the printing setting screen extension unit 205 determines whether the user changes the printing setting through the control items 901 to 904. If it is determined in S811 that the printing setting is changed, the processing by the printing setting screen extension unit 205 proceeds to S812, and the change in the printing setting made by the user is reflected on the printing setting information such as PT. Thereafter, the processing proceeds to S813. On the other hand, if it is determined in S811 that the printing setting is not changed, the processing by the printing setting screen extension unit 205 proceeds to S813.

In S813, the printing setting screen extension unit 205 determines whether the OK button 906 is pressed. If it is determined in S813 that the OK button 906 is pressed, the printing setting screen 900 is closed, and PT at the point of pressing is returned to the rendering application 201 or the OS as the printing setting designated by the user. The rendering application 201 or the OS uses the returned PT to generate a printing job in accordance with the setting. If it is determined in S813 that the OK button 906 is not pressed, the processing by the printing setting screen extension unit 205 proceeds to S804. The processing from S804 to S813 is repeated until the OK button 906 is pressed.

<Skip Processing by Skip Control Unit>

Figure 11:
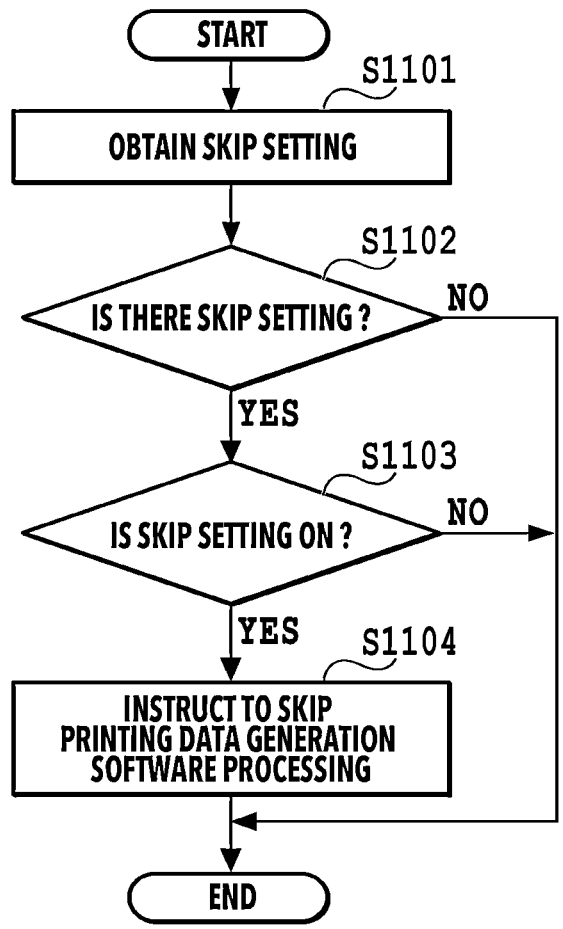
FIG. 11 is a flowchart illustrating an example of the skip processing.

FIG. 11 is a flowchart illustrating an example of the skip processing by the skip control unit 206. Hereinafter, the skip control unit 206 may be described as a unit having a central role in each processing; however, in reality, a corresponding function is implemented by the CPU 111 executing a corresponding program.

The flow in FIG. 11 is executed in a timing in which the rendering application 201 issues the printing instruction. In other words, the flow in FIG. 11 is executed with the OS activating the skip control unit in response to the issuance of the printing instruction from the rendering application 201.

First, in S1101, the skip control unit 206 obtains the skip setting from the common information 210. Next, in S1102, the skip control unit 206 determines whether the skip setting could be obtained or, in other words, whether there is the skip setting. If it is determined that there is no skip setting, the skip control unit 206 withdraws from the present processing flow without performing the skip processing. If it is determined in S1102 that there is the skip setting, the processing by the skip control unit 206 proceeds to S1103. In S1103, the skip control unit 206 determines whether the obtained skip setting is ON. If it is determined in S1103 that the skip setting is OFF, the skip control unit 206 withdraws from the present processing flow without performing the skip processing. If it is determined in S1103 that the skip setting is ON, the processing by the skip control unit 206 proceeds to S1104. In S1104, the skip control unit 206 outputs the instruction to perform the skip processing in which the processing of the printing data generation software 202 is skipped. Thus, in the printing data generation software 202, the conversion processing from the intermediate data into the printing data is not performed, and the input data treated in the printing data edit unit 208 can be used as the intermediate data.

In FIG. 11, the default operation in a case where the skip setting is not stored is not to perform the skip processing; however, the default operation may be to perform the skip processing. With the above-described processing, whether to skip the processing of the printing data generation software 202 can be switched based on the skip setting of the common information 210.

<Printing Data Edit Unit Processing>

Figure 12:
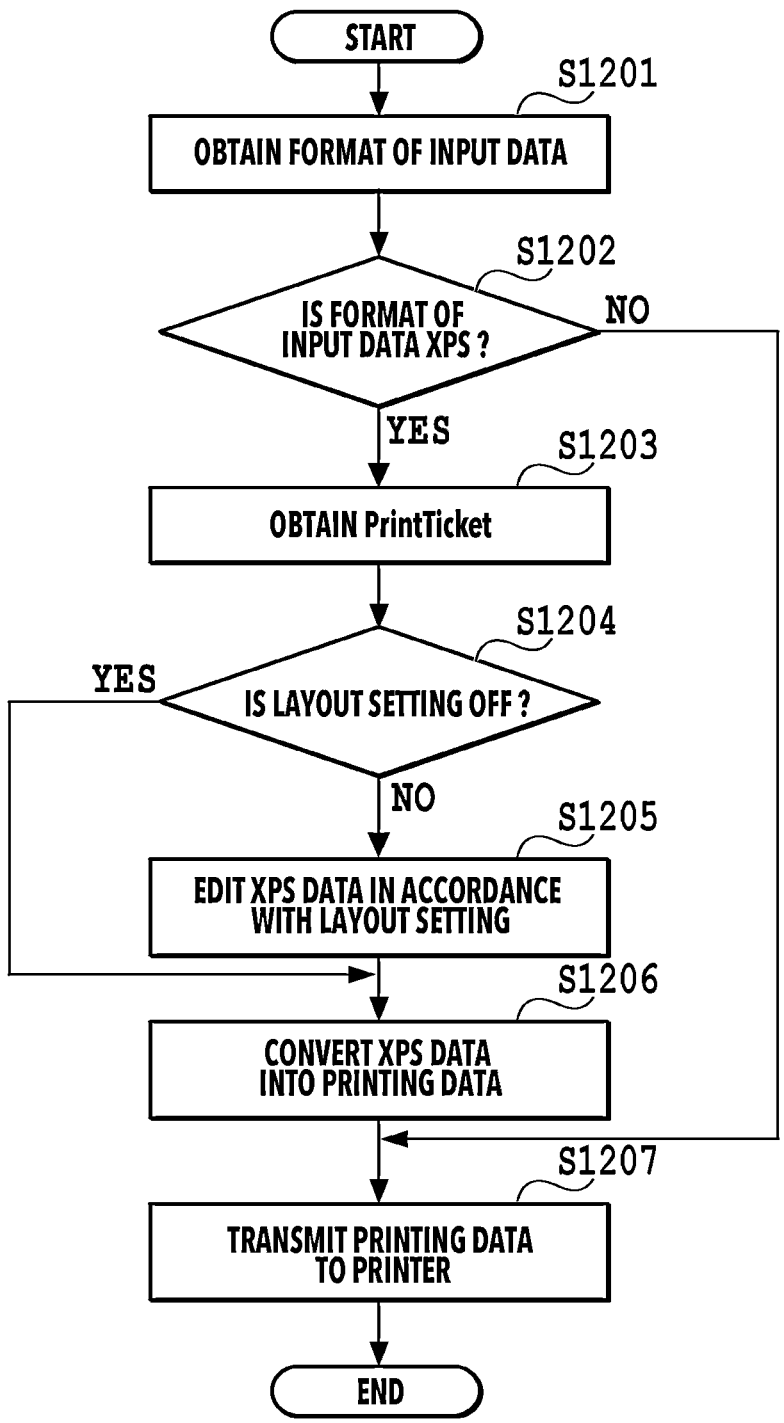
FIG. 12 is a flowchart illustrating an example of printing data edit processing.

FIG. 12 is a flowchart illustrating an example of the printing data edit processing by the printing data edit unit 208. Hereinafter, the printing data edit unit 208 may be described as a unit having a central role in each processing; however, in reality, a corresponding function is implemented by the CPU 111 executing a corresponding program.

The flow in FIG. 12 is executed in a timing in which processing of the output data from the printing data generation software 202 is allowed. First, in S1201, the printing data edit unit 208 obtains the data format of the input data. Next, in S1202, the printing data edit unit 208 determines whether the obtained input data format is the XPS data. If it is determined in S1202 that the input data format is not the XPS data, the processing by the printing data edit unit 208 proceeds to S1207. If the input data is not the XPS data, the skip instruction in S1104 is not provided, and the input data is converted by the printing data generation software 202 into the printing data that the printer is able to construe. Thus, in S1207, the printing data edit unit 208 transmits the printing data, which is the obtained input data, to the printer and withdraws from the present processing flow.

On the other hand, if it is determined in S1202 that the format of the input data is the XPS data, the processing by the printing data edit unit 208 proceeds to S1203. In S1203, the printing data edit unit 208 obtains PT that is the printing setting information. Next, in S1204, the printing data edit unit 208 confirms the layout setting of PT obtained in S1203 and determines whether the layout setting is OFF. If it is determined in S1204 that the layout setting is OFF, the XPS data does not need to be edited; thus, the processing by the printing data edit unit 208 proceeds to S1206. On the other hand, if it is determined in S1204 that the layout setting is ON, the processing by the printing data edit unit 208 proceeds to S1205. In S1205, the printing data edit unit 208 edits the XPS data that is the input data and performs the layout processing in accordance with the layout setting. The processing then proceeds to S1206.

In a configuration in which the printing data generation software 202 supports the layout function, the intermediate data is the one already subjected to the layout processing. Thus, the processing in S1204 and S1205 does not need to be performed. The determination on whether the printing data generation software 202 supports the layout function is made with the printing data edit unit 208 sharing with the printing function extension unit 207 the result of determining in S402 in FIG. 4 that PDC includes the layout function.

Figure 13:
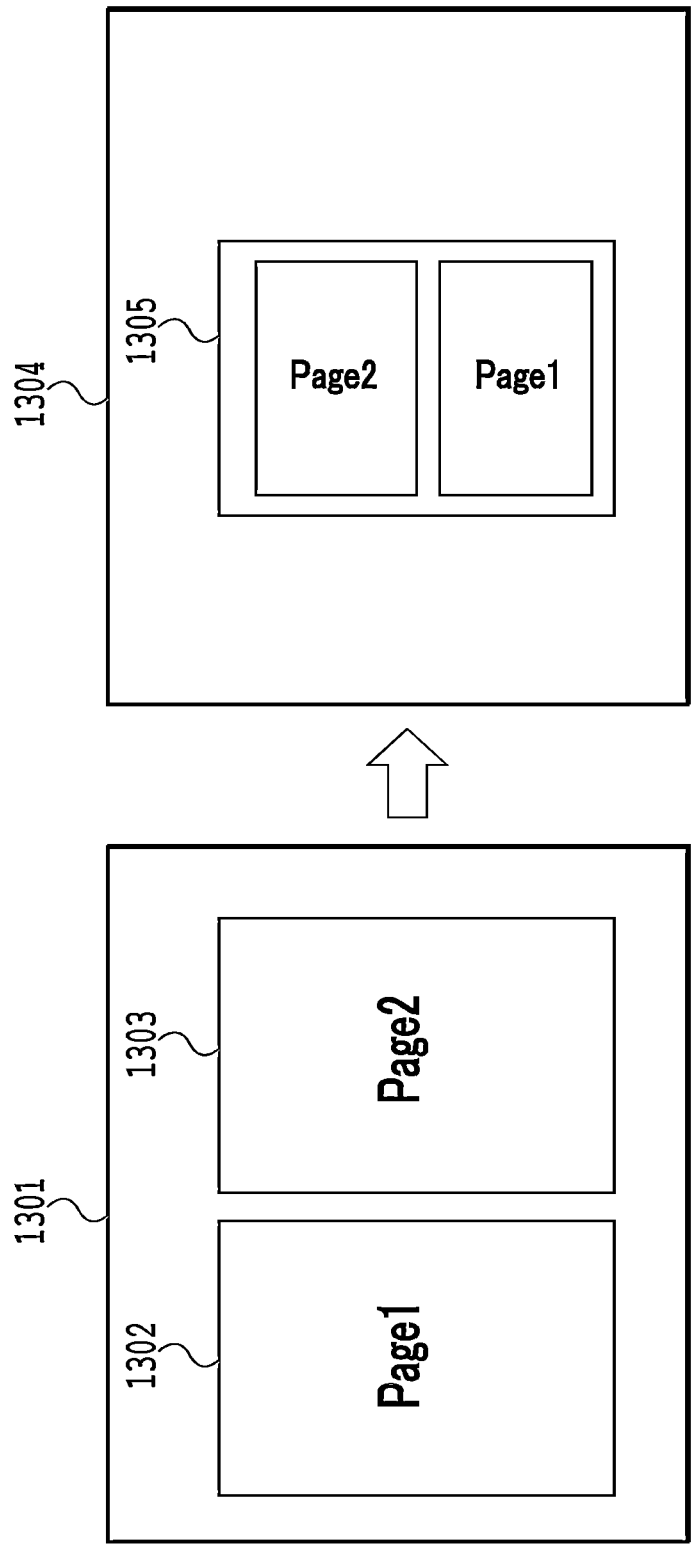
FIG. 13 is a diagram illustrating an example of layout processing.

FIG. 13 is a diagram illustrating an example of the layout processing in S1205. In FIG. 13, 2 in 1 in which two pages are arranged in one page is set as the layout setting. XPS data 1301, which is the input data of the printing data edit unit 208, includes two page data 1302 and 1303. The printing data edit unit 208 generates XPS data 1304 including page data 1305 in which the two page data 1302 and 1303 are arranged in one page by the processing in S1205.

Referring back to FIG. 12, and the description is continued. In S1206, the printing data edit unit 208 converts the XPS data into the printing data that the printing apparatus 102 is able to construe. In a case where the printing apparatus 102 is able to construe the XPS data, the printing data edit unit 208 does not need to perform the processing in S1206. Next, in S1207, the printing data edit unit 208 transmits the printing data to the printer and ends the present processing flow.

As described above, according to the present embodiment, the extension application 204 can provide a better function. In the printing system in the present embodiment, even in a case where the skip control unit 206 cannot access the printing setting information (PT), it is possible to switch whether to skip the processing of the printing data generation software 202. In a case of using a function that needs to treat the intermediate data like the layout function, it is possible to treat the intermediate data in the printing data edit unit 208 by providing an instruction to skip the processing of the printing data generation software 202. As a result, it is possible to perform the edition including scaling like the layout function without causing the image quality deterioration.

In a case of not using the function that needs to treat the intermediate data, the printing data generation processing by the printing data generation software 202 is performed with the user setting the skip setting to OFF, and it is possible to reduce a processing load of the extension application 204. With the switching of the skip setting, it is possible to switch whether to perform the printing data generation by the printing data generation software 202 or by the extension application 204. Thus, it is possible to use the switching to avoid a problem in a case where the other conversion processing does not operate normally. It is possible to suppress occurrence of a printing result with bad quality by disabling the layout setting in a case where the skip setting is OFF.

In the present embodiment, here is described an example in which the user switches the skip setting by using the printing setting screen 900; however, the setting may be set by using another setting screen.

Thus, according to the present embodiment, since the extension application 204 can process the intermediate data in the vector format, the extension application 204 is able to treat data in a format that is proper for the processing performed by the extension application 204. Thus, the extension application 204 can perform the processing of the specific function, which is the layout processing including scaling of an image, while suppressing the image deterioration.

Second Embodiment

In the first embodiment, there is described an example in which the setting value of the skip setting is stored in the common information 210 in accordance with the setting set by the user by using the printing setting screen 900. Also, there is described an example in which the skip control unit 206 switches whether to skip the processing of the printing data generation software 202 based on the setting value of the skip setting stored in the common information 210. In this case, it can be considered that whether the skipping of the processing of the printing data generation software 202 is needed can be determined in accordance with the processing performed by the printing data edit unit 208 and the data format proper for the processing.

The extension application 204 is an application capable of operating in association with multiple types of the printing apparatuses 102. Accordingly, it can be considered that the extension application 204 operates in association with the multiple types of the printing apparatuses 102 supporting formats of different printing data. The format of the printing data outputted by the printing data generation software 202 is different depending on the format of the printing data that is supported by the associated printing apparatus 102. For example, in a case where the format of the printing data that is supported by the printing apparatus 102 is PWG Raster that is raster data, the printing data generation software 202 outputs the printing data in the format of PWG Raster that is raster data. In a case where the format of the printing data that is supported by the printing apparatus 102 is PDF that is vector data, the printing data generation software 202 outputs the printing data in the format of PDF.

In this case, for example, if the layout processing is executed by the printing data edit unit 208, and if the input data is PWG Raster, the deterioration of the image quality caused by the layout processing including scaling of the data is great. On the other hand, if the input data is PDF that is vector data, the deterioration of the image quality caused by the layout processing including scaling is small. Accordingly, it can be said that whether the processing of the printing data generation software 202 needs to be skipped is changed depending on the data format of the printing data that is supported by the printing apparatus 102.

In view of this, in the second embodiment, here is described an example in which whether the skip control unit 206 performs the skip processing is switched depending on the format of the printing data that is supported by the printing apparatus 102 associated with the extension application 204. The basic hardware configuration and software configuration are similar to that in the example described in the first embodiment; for this reason, the descriptions are omitted.

<Processing Flow of Printing Function Extension Unit>

Figure 14:
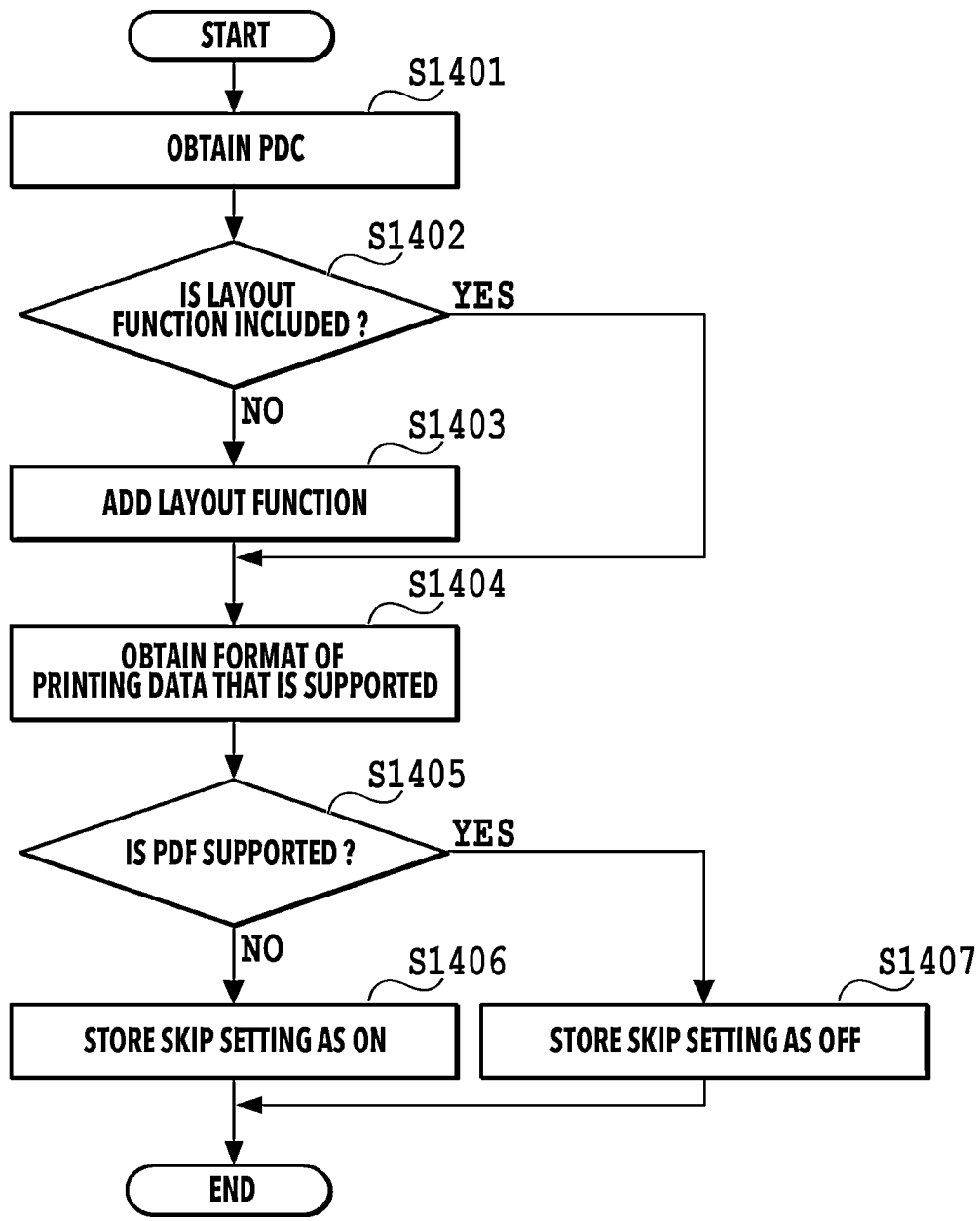
FIG. 14 is a flowchart illustrating an example of the edit processing of the printing function information.

FIG. 14 is a flowchart illustrating an example of the edit processing of the printing function information of the printing function extension unit 207 in the present embodiment. Hereinafter, the printing function extension unit 207 may be described as a unit having a central role in each processing; however, in reality, a corresponding function is implemented by the CPU 111 executing a corresponding program.

The processing from S1401 to S1403 is the same as that from S401 to S403 in FIG. 4; for this reason, the descriptions are omitted. In S1404, the printing function extension unit 207 obtains the format of the printing data that is supported by the printing apparatus 102. The method of obtaining the format supported by the printing apparatus 102 includes a method of transmitting a Get-Printer-Attributes operation to the printing apparatus 102 and obtaining information in response. However, the format may be obtained by another method.

Next, in S1405, the printing function extension unit 207 determines whether the printing apparatus 102 supports PDF as the format of the printing data. If it is determined in S1405 that PDF is not supported, the processing by the printing function extension unit 207 proceeds to S1406. In S1406, the printing function extension unit 207 stores the setting value of the skip setting as ON into the common information 210 and ends the present processing flow. That is, in a case where the printing apparatus 102 does not support PDF, the printing data generation software 202 does not output the printing data in the format of PDF. In this case, for example, the printing data generation software 202 outputs the printing data in the format of PWG Raster that is raster data. The raster data has the possibility of the deterioration of the image quality due to the layout processing including scaling. For this reason, in a case where the printing apparatus 102 does not support PDF, the printing function extension unit 207 stores the setting value of the skip setting as ON and sets the setting to skip the processing of the printing data generation software 202.

On the other hand, if it is determined in S1405 that PDF is supported, the processing by the printing function extension unit 207 proceeds to S1407. In S1407, the printing function extension unit 207 stores the setting value of the skip setting as OFF into the common information 210 and ends the present flow. That is, in a case where the printing apparatus 102 supports PDF, the printing data generation software 202 outputs the printing data in the format of PDF that is vector data. Even in a case of performing the layout processing including scaling, the vector data has the deterioration of the image quality less than the case of processing the raster data. For this reason, in a case where the printing apparatus 102 supports PDF, the printing function extension unit 207 does not need to skip the processing of the printing data generation software 202, and thus the setting value of the skip setting is stored as OFF.

In the first embodiment, in a case where the printing function extension unit 207 adds the layout function, the setting value of the skip setting to be stored in the common information 210 is not stored as ON or OFF. On the other hand, in the present embodiment, the skip setting is also stored into the common information 210 in a case where the printing function extension unit 207 adds the function depending on the format supported by the printing apparatus 102.

<Processing Flow of Printing Setting Screen Extension Unit>

Figure 15:
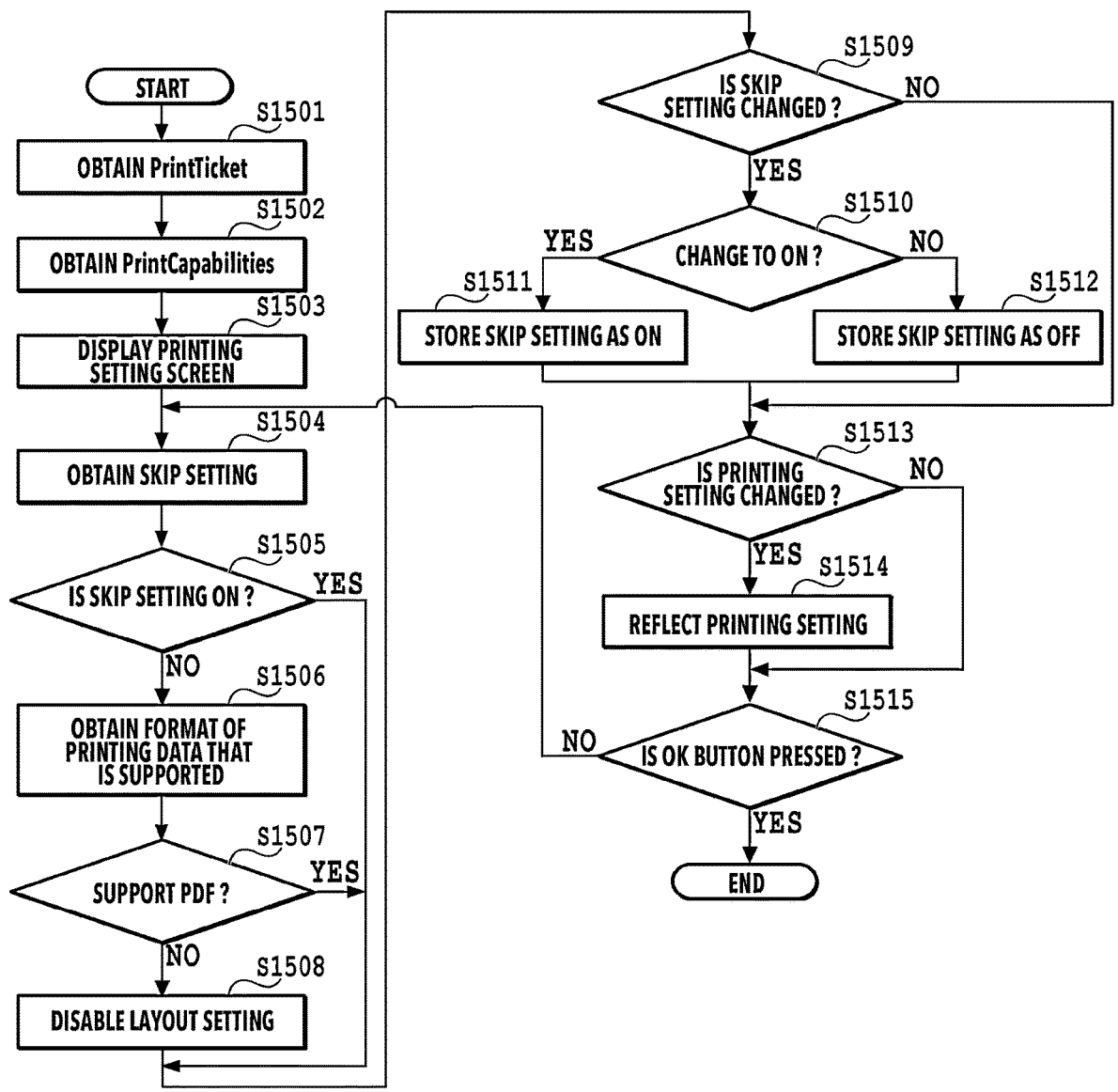
FIG. 15 is a flowchart illustrating an example of the printing setting screen display processing.

FIG. 15 is a flowchart illustrating an example of the printing setting screen display processing of the printing setting screen extension unit 205 in the present embodiment. Hereinafter, the printing setting screen extension unit 205 may be described as a unit having a central role in each processing; however, in reality, a corresponding function is implemented by the CPU 111 executing a corresponding program.

The processing from S1501 to S1505 is the same as that from S801 to S805; for this reason, the descriptions are omitted. If it is determined that it is No in S1505, or in other words, if it is determined that the skip setting is OFF, the processing proceeds to S1506. In S1506, the printing setting screen extension unit 205 obtains the format of the printing data that is supported by the printing apparatus 102 associated with the extension application 204. Next, in S1507, the printing function extension unit 207 determines whether the printing apparatus 102 supports PDF as the format of the printing data. Since it is possible to perform the layout processing on the PDF data in the present embodiment, if it is determined in S1507 that PDF is supported, the processing proceeds to S1509, and the control item through which the layout setting is set is not disabled. In other words, even in a case where the skip setting is OFF, if the printing apparatus 102 supports PDF, the control item through which the layout setting is set is not disabled. On the other hand, if it is determined in S1507 that PDF is not supported, the printing function extension unit 207 disables in S1508 the control item through which the layout setting is set.

The processing from S1509 to S1515 is the same as that from S807 to S813; for this reason, the descriptions are omitted. In a case where the printing data generation software 202 supports the layout function, as with the example described in the first embodiment, a configuration in which the layout function can be set through the printing setting screen 900 may be applicable. In other words, the processing in S1508 may not be performed even in a case where the skip setting is OFF in S1505 and also the printing apparatus 102 does not support PDF in S1507.

<Processing Flow of Printing Data Edit Unit>

Figure 16:
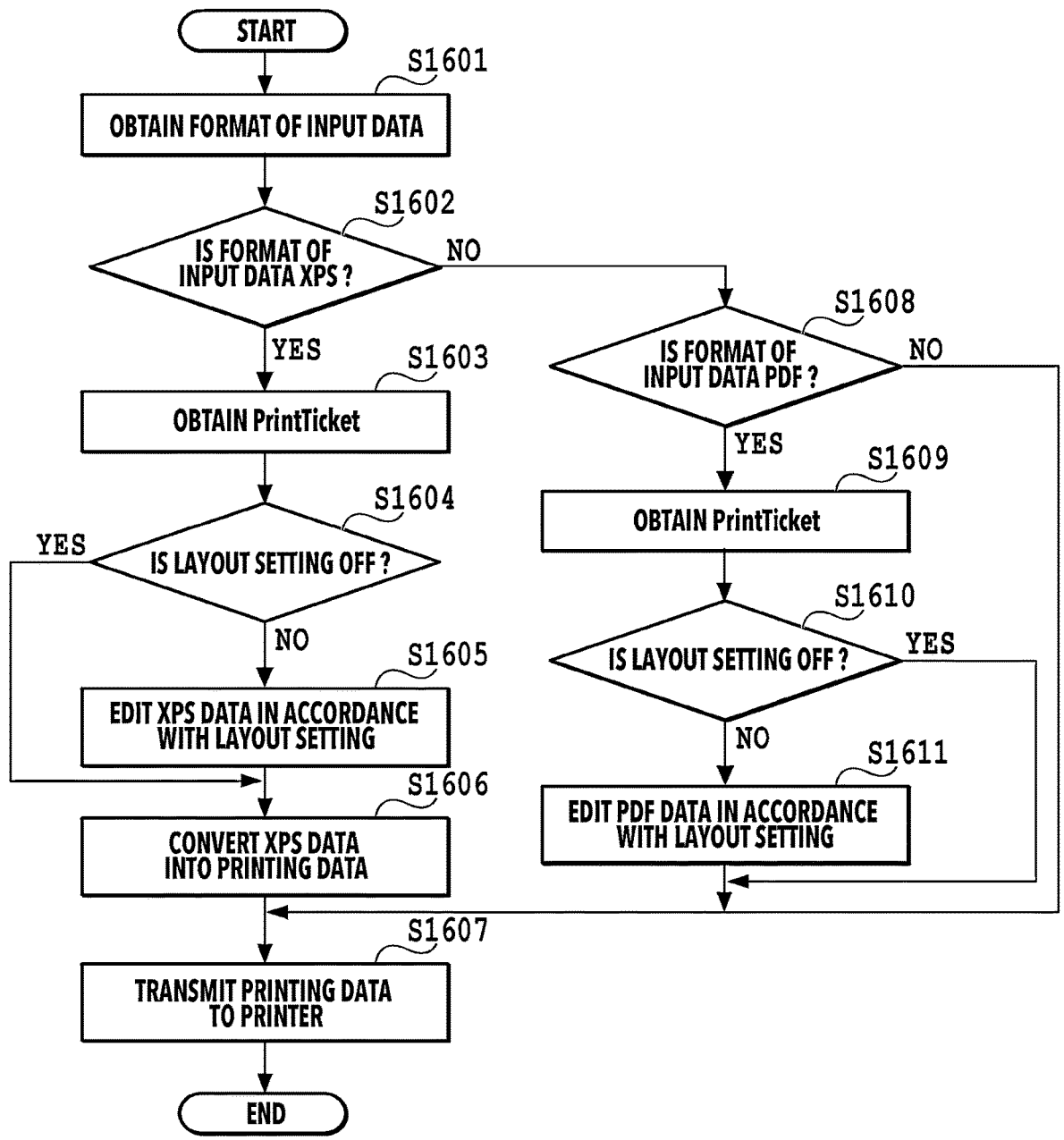
FIG. 16 is a flowchart illustrating an example of the edit processing of the printing function information.

FIG. 16 is a flowchart illustrating an example of the edit processing of the printing function information of the printing data edit unit 208 in the second embodiment. Hereinafter, the printing data edit unit 208 may be described as a unit having a central role in each processing; however, in reality, a corresponding function is implemented by the CPU 111 executing a corresponding program.

The processing from S1601 to S1607 is the same as that from S1201 to S1207; for this reason, the descriptions are omitted. If it is determined that it is No in S1602, or in other words, if the format of the input data is not the XPS data, the processing by the printing data edit unit 208 proceeds to S1608. In S1608, the printing data edit unit 208 determines whether the format of the input data is PDF. If it is determined in S1608 that the format of the input data is PDF, the processing by the printing data edit unit 208 proceeds to S1609. In S1609, the printing data edit unit 208 obtains PrintTicket (PT) that is the printing setting information. Next, in S1610, the printing data edit unit 208 confirms the layout setting of PrintTicket obtained in S1609 and determines whether the layout setting is OFF. If it is determined that the layout setting is OFF in S1610, the PDF data does not need to be edited; thus, the processing by the printing data edit unit 208 proceeds to S1607.

If it is determined that the layout setting is ON in S1610, the processing by the printing data edit unit 208 proceeds to S1611. In S1611, the printing data edit unit 208 edits the PDF data that is the input data in accordance with the layout setting. Thereafter, the processing proceeds to the processing of transmitting the printing data in S1607. In the present example, the PDF data is in the format of the printing data that is supported by the printing apparatus 102. Thus, the conversion processing into the printing data like that in S1606 (S1206) is unnecessary.

If it is determined in S1608 that the format of the input data is not PDF, the processing by the printing data edit unit 208 proceeds to S1607 to transmit the input data directly to the printing apparatus 102 as the printing data, and the processing ends. In a configuration in which the printing data generation software 202 supports the layout function, the intermediate data is already subjected to the layout processing as described in the first embodiment. Accordingly, in a case where the printing data generation software 202 supports the layout function, the processing of S1604, S1605, S1610, and S1611 does not need to be performed.

As described above, in the printing system in the present embodiment, whether to skip the processing of the printing data generation software 202 is switched based on the format of the printing data that is supported by the printing apparatus. With this, it is possible to control the input data of the printing data edit unit 208 to be proper for the processing. In the present embodiment, it is also possible to change the skip setting through the printing setting screen 900; however, a configuration that does not allow the user to change the skip setting may be applicable. This is because, in the present embodiment, it is possible to determine whether it is necessary to skip the processing of the printing data generation software 202 depending on the format of the printing data that is supported by the printing apparatus 102.

Third Embodiment

As described above, whether it is necessary to skip the processing of the printing data generation software 202 can be determined in accordance with the processing performed by the printing data edit unit 208 and the data format proper for the processing. In the second embodiment, there is described an example in which, focusing on the data format, the extension application 204 switches whether to skip the processing of the printing data generation software 202 depending on the format of the printing data that is supported by the associated printing apparatus 102.

In the present embodiment, the processing performed by the printing data edit unit 208 is focused. For example, in a case where the layout processing including scaling such as the layout function is not performed by the printing data edit unit 208, it is unnecessary to skip the processing of the printing data generation software 202.

For example, it is also possible to perform the layout function by the printing apparatus 102. In this case, the printing data generation software 202 adds the layout function to the printing function information 203 (PDC) based on the capability information (PC) obtained from the printing apparatus 102. Then, with the printing data generation software 202 or the extension application 204 notifying the printing apparatus 102 of PT including the layout setting, the printing apparatus 102 performs the layout processing. Alternatively, in a case where the printing data generation software 202 supports the layout function, the output data of the printing data generation software 202 reflects the layout setting. In those cases, the extension application 204 does not need to add the layout function to the printing function information 203, and the processing of the printing data generation software 202 does not need to be skipped as well.

In view of this, in the present embodiment, here is described an example in which the skip setting is stored depending on whether the extension application 204 adds the function that requires the edition of the vector data.

<Processing Flow of Printing Function Extension Unit>

Figure 17:
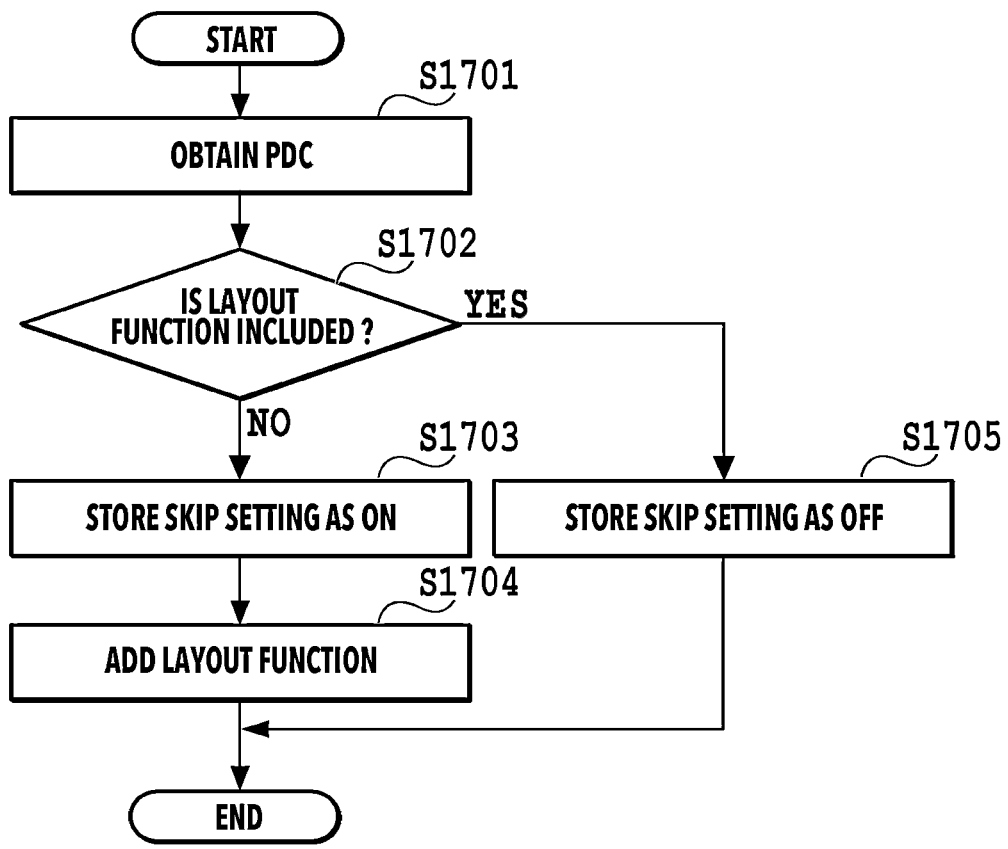
FIG. 17 is a flowchart illustrating an example of the printing setting screen display processing.

FIG. 17 is a flowchart illustrating an example of the printing setting screen display processing of the printing function extension unit 207 in a third embodiment. Hereinafter, the printing function extension unit 207 may be described as a unit having a central role in each processing; however, in reality, a corresponding function is implemented by the CPU 111 executing a corresponding program. The processing in FIG. 17 is started with the OS activating the printing function extension unit 207 in a timing in which the extension application 204 is associated for the first time, for example. The processing in FIG. 17 may be executed in a timing in which the configuration of the printing apparatus 102 is changed.

The processing from S1701 to S1702 is the same as that from S401 to S402 in FIG. 4; for this reason, the descriptions are omitted. In S1702, if it is determined that PDC does not include the layout function, the processing by the printing function extension unit 207 proceeds to S1703. In S1703, the printing function extension unit 207 stores the setting value of the skip setting as ON into the common information 210. In S1704 following the processing in S1703, the printing function extension unit 207 writes Feature and Option related to the layout function into PDC and withdraws from the present processing flow. In other words, in a case where PDC does not include the layout function, the layout function is processing performed by the printing data edit unit 208 as described in the first embodiment and so on. Thus, the setting value of the skip setting is set to ON to set the setting in which the processing of the printing data generation software 202 is skipped.

On the other hand, if it is determined in S1702 that PDC includes the layout function, the processing by the printing function extension unit 207 proceeds to S1705. In S1705, the printing function extension unit 207 stores the setting value of the skip setting as OFF into the common information 210 and withdraws from the present processing flow. In other words, in a case where PDC includes the layout function, the printing apparatus 102 executes the layout processing; accordingly, the printing data edit unit 208 does not need to perform the layout processing. Thus, the processing of the printing data generation software 202 does not need to be skipped as well. Therefore, the setting value of the skip setting is set to OFF.

As described above, in the printing system in the present embodiment, whether to skip the processing of the printing data generation software 202 is switched depending on the function added by the extension application. With this, it is possible to make control in accordance with the processing performed by the printing data edit unit 208 such that the input data of the printing data edit unit 208 has a proper format. In S1702, whether the printing data generation software 202 supports the layout function may be determined. In a case where the printing data generation software 202 supports the layout function, a configuration in which the layout function can be set through the printing setting screen 900 even if PDC does not include the layout function and the setting value of the skip setting is OFF may be applicable.

In the second embodiment and the third embodiment, the skip setting is switched depending on the format of the printing data that is supported by the printing apparatus 102 and the function added by the extension application 204; however, the switching may be performed depending on another element. For example, in a case where there are multiple types of the printing data generation software 202 associated with the extension application 204, it can be considered that the corresponding function and the format of the printing data to be outputted may be different depending on the type. In such a case, the extension application 204 may switch the skip setting depending on the type of the associated printing data generation software 202. As the type of the printing data generation software 202, the one applied to local printing in which printing is performed in a printing apparatus connected to a host computer may be considered. Also, the one applied to cloud printing in which a printing job is transmitted to cloud and a printing apparatus obtains the job from the cloud to perform printing may be considered. In the cloud printing, it can be considered that the extension to perform processing of printing data such as the layout function is performed on the cloud side. For the function to perform the processing on the cloud side, the extension application 204 does not need to perform processing; for this reason, it can be considered that the skip setting is set to OFF in a case where the extension application 204 is associated with the printing data generation software 202 for the cloud printing.

The descriptions of the present embodiment are mainly about different points from the first embodiment; however, processing combined with the second embodiment may be performed. That is, the processing in S1402 and S1403 in FIG. 14 of the second embodiment may be replaced with S1702 to S1704 of the present embodiment.

Fourth Embodiment

In the first embodiment, there is described an example of a configuration in which the printing setting screen extension unit 205 disables the control item for the layout setting in a case where the skip setting is OFF so as to prevent the user from setting a function that the user cannot use. In this case, depending on the type of the rendering application 201, there is an application that provides a unique printing setting screen with reference to PC without activating the printing setting screen extension unit 205 of the extension application 204. With such a rendering application 201, the printing setting is set without using the printing setting screen provided by the printing setting screen extension unit 205, and thus the layout function can be set even in a case where the skip setting is OFF. That is, since the layout function is enabled in PDC, the layout function can be set with reference to PC based on PDC. Accordingly, in order to prevent PC from including an item that cannot be used, the description related to the layout function is required to be deleted from the printing function information 203 (PDC) in a case where the skip setting is OFF.

In view of this, in the present embodiment, here is described an example in which the printing function extension unit 207 performs processing of deleting the function in addition to the processing adding the function of PDC in accordance with the skip setting.

<Processing Flow of Printing Function Extension Unit>

Figure 18:
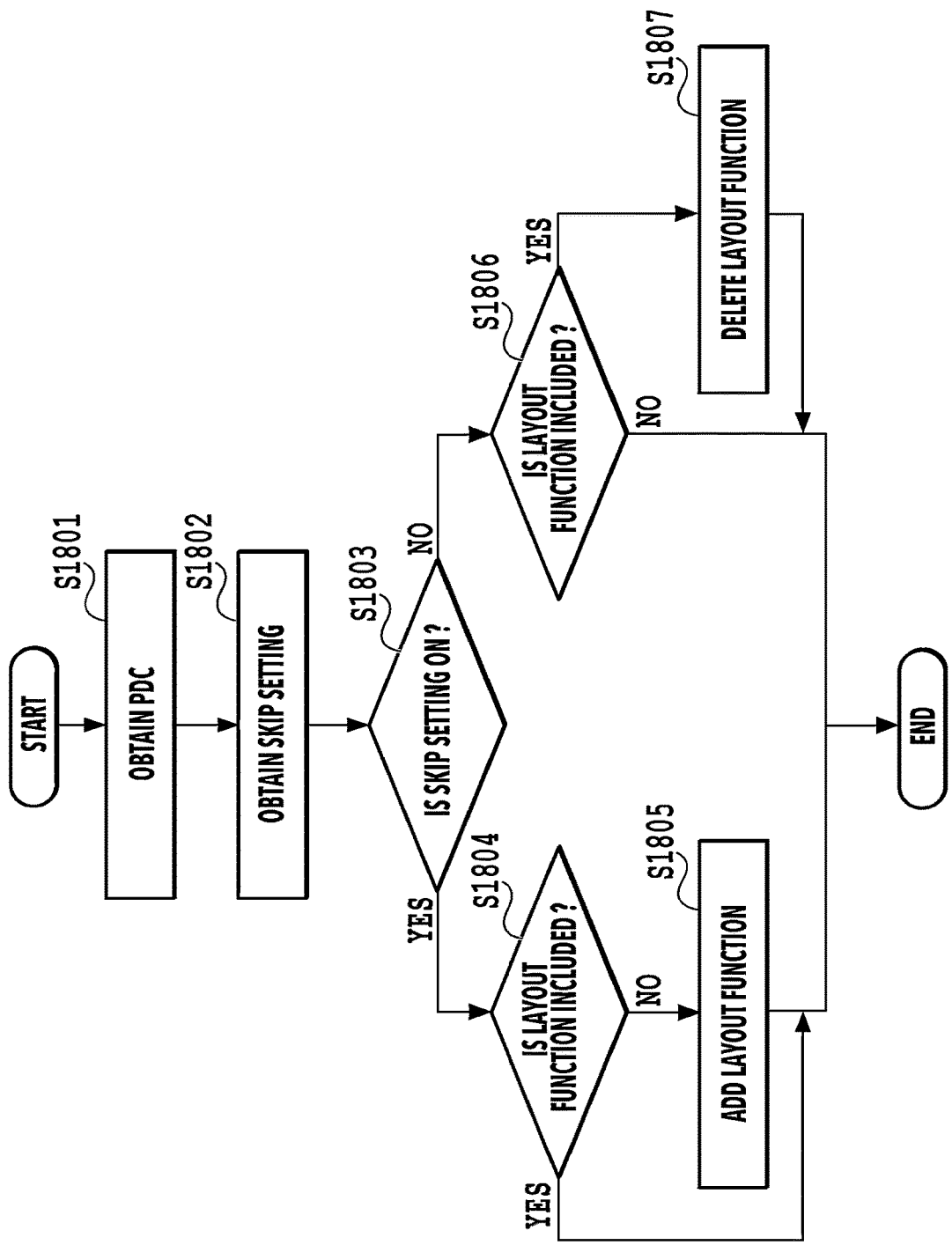
FIG. 18 is a flowchart illustrating an example of the edit processing of the printing function information.

FIG. 18 is a flowchart illustrating an example of the edit processing of the printing function information of the printing function extension unit 207 in a fourth embodiment. Hereinafter, the printing function extension unit 207 may be described as a unit having a central role in each processing; however, in reality, a corresponding function is implemented by the CPU 111 executing a corresponding program. The processing in FIG. 18 may be executed in the same timing as that in FIG. 4 or may be executed in another timing. In other words, the processing in FIG. 18 may be executed in a case where the printing function extension unit 207 is activated in a timing in which the extension application 204 is associated for the first time, for example. The processing in FIG. 18 may be executed in a case where the configuration of the printing apparatus 102 is changed or in a case where there is the instruction to obtain the printing setting or the printing instruction, or the processing may be executed in response to an instruction by the user in an arbitrary timing.

First, in S1801, the printing function extension unit 207 obtains PDC. Next, in S1802, the printing function extension unit 207 obtains the skip setting. In a case where no skip setting is stored in the common information 210 because it is the first activation or the like, the setting value of ON or OFF set as default is obtained instead.

Next, in S1803, the printing function extension unit 207 determines whether the setting value of the skip setting is ON. If it is determined in S1803 that the setting value of the skip setting is ON, the processing by the printing function extension unit 207 proceeds to S1804. In S1804, the printing function extension unit 207 determines whether the obtained PDC includes the layout function. If it is determined in S1804 that PDC includes the layout function, the printing function extension unit 207 withdraws from the present processing flow without editing PDC. If it is determined in S1804 that PDC does not include the layout function, the processing proceeds to S1805, and the printing function extension unit 207 writes Feature and Option related to the layout function into the obtained PDC and withdraws from the present processing flow.

On the other hand, if it is determined in S1803 that the setting value of the skip setting is OFF, the processing by the printing function extension unit 207 proceeds to S1806. In S1806, the printing function extension unit 207 determines whether the obtained PDC includes the layout function. If it is determined in S1806 that PDC includes the layout function, the processing proceeds to S1807, and the printing function extension unit 207 deletes the descriptions of Feature and Option related to the layout function from the obtained PDC and withdraws from the present processing flow. This is because, in a case where the setting value of the skip setting is OFF and also PDC includes the layout function, the rendering application 201 that provides the unique printing setting screen with reference to PC without activating the printing setting screen extension unit 205 performs the layout setting. To avoid this, the descriptions related to the layout function are deleted from PDC in S1807.

In the present processing flow, here is described an example in which the layout function is deleted from PDC without exception in a case where the setting value of the skip setting is OFF; however, in a case where the printing data generation software 202 is provided with the layout function in advance, the descriptions of the layout function do not need to be deleted. Thus, the deletion target in S1807 may be limited to the layout function that is added by the extension application 204. If it is determined in S1806 that PDC does not include the layout function, the printing function extension unit 207 withdraws from the present processing flow without editing PDC.

As described above, in the present embodiment, in a case where the processing of the printing data generation software 202 is not skipped, the extension application 204 deletes from PDC the function premised to be skipped. With this, the concerned function is not written in PC as well, and it is possible to suppress the setting of the unusable function in the application that provides the unique printing setting screen based on PC. In a case where the setting value of the skip setting is set to ON, the concerned function becomes usable again.

In the present embodiment, different points from the first embodiment are mainly described; however, a mode combined with the second embodiment or the third embodiment may be applicable.

Fifth Embodiment

In the first embodiment, there is described an example in which the extension application 204 sets the skip setting through the printing setting screen 900 displayed by the printing setting screen extension unit 205. The printing setting screen 900 is activated to set the printing setting in a case where the rendering application 201 provides the printing instruction. On the other hand, the skip setting is stored into the common information 210, and the skip processing in S1104 is performed in accordance with the setting value of the skip setting stored in the common information 210 at the point at which the skip control unit 206 performs the processing. Thus, the skip setting cannot be managed by the unit of job. For example, here is assumed a case where printing is performed by each of a rendering application A and a rendering application B. In this case, the skip setting set through the printing setting screen 900 called by the rendering application A may also affect the processing of the printing job generated in response to the printing instruction from the rendering application B.

In view of this, in the present embodiment, here is described an example in which whether to set the skip setting by an application that calls the printing setting screen extension unit 205 is switched.
<Processing Flow of Printing Setting Screen Extension Unit>

Figure 19:
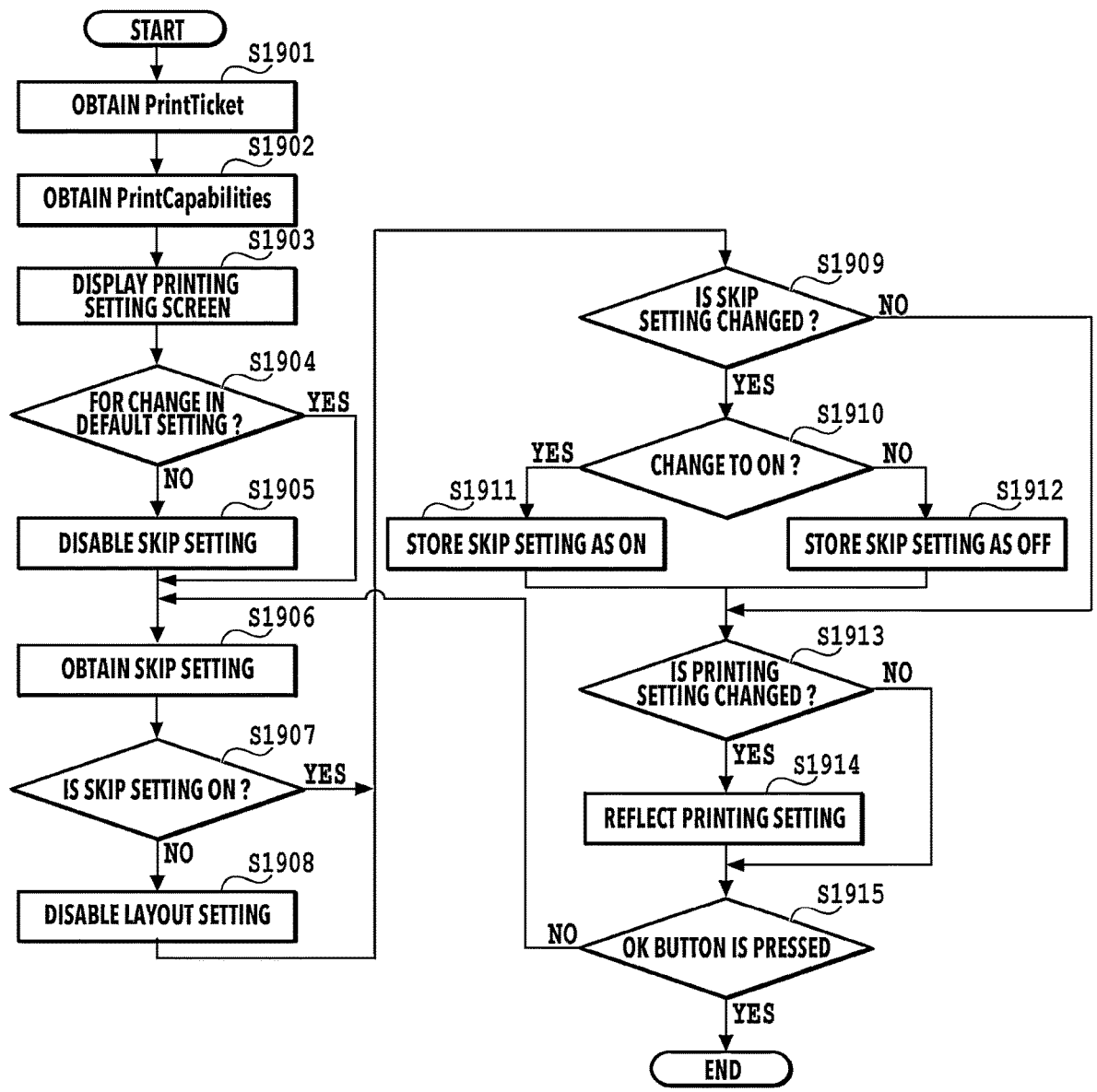
FIG. 19 is a flowchart illustrating an example of the printing setting screen display processing.

FIG. 19 is a flowchart illustrating an example of the printing setting screen display processing of the printing setting screen extension unit 205 in the present embodiment. Hereinafter, the printing setting screen extension unit 205 may be described as a unit having a central role in each processing; however, in reality, a corresponding function is implemented by the CPU 111 executing a corresponding program.

S1901 to S1903 are the same as S801 to S803; for this reason, the descriptions are omitted. In S1904, the printing setting screen extension unit 205 confirms whether the printing setting screen is called to change the default setting. For example, in the Windows (registered trademark) OS, there is a Settings application for managing the setting of the OS. A device including a printer can be also managed from the Settings application. Once the printing setting screen of the printing data generation software 202 associated with the specific printing apparatus 102 is activated from the Settings application and the printing setting is changed, the changed setting is saved as the default printing setting in the designated printing apparatus 102. The default printing setting is used as the initial setting in a case where the printing setting screen is opened from the rendering application 201. The default printing setting is also the printing setting that is used in a case where printing is performed without opening the printing setting screen from the rendering application 201. That is, it can be considered that the default setting is for setting of the printing setting that is desired to be reflected on all kinds of printing.

In the present embodiment, the determination in S1904 is determined to be Yes in a case where the printing setting screen is activated from the Settings application. If it is determined in S1904 that it is for the change in the default setting, the processing by the printing setting screen extension unit 205 proceeds to S1906 in order to allow for the change in the skip setting. On the other hand, if it is determined in S1904 that it is not for the change in the default setting, the processing by the printing setting screen extension unit 205 proceeds to S1905. In S1905, the printing setting screen extension unit 205 disables the control item 905 through which the skip setting is set, and the processing proceeds to S1906. S1906 to S1915 are the same as the processing from S804 to S813; for this reason, the descriptions are omitted.

As described above, in the present embodiment, it is possible to change the skip setting only through the printing setting screen through which the default printing setting is changed. With this, the user easily recognizes a range affected by the change in the setting.

In the present embodiment, the skip setting is changeable through the printing setting screen 900; however, the setting may be changed with the extension application 204 providing a setting screen different from the printing setting screen 900.

In the present embodiment, different points from the first embodiment are mainly described; however, a mode combined with any one of the second embodiment to the fourth embodiment may be applicable.

Sixth Embodiment

As described in the fifth embodiment, the change in the skip setting made through the printing setting screen activated from the rendering application 201 also affects the processing of the printing job from another rendering application 201. In view of this, in the present embodiment, here is described an example in which whether to allow the skip setting to be changed through the printing setting screen is switched depending on whether there is a printing job in the middle of processing in the printing data generation software 202 or the extension application 204.
<Processing Flow of Printing Setting Screen Extension Unit>

Figure 20:
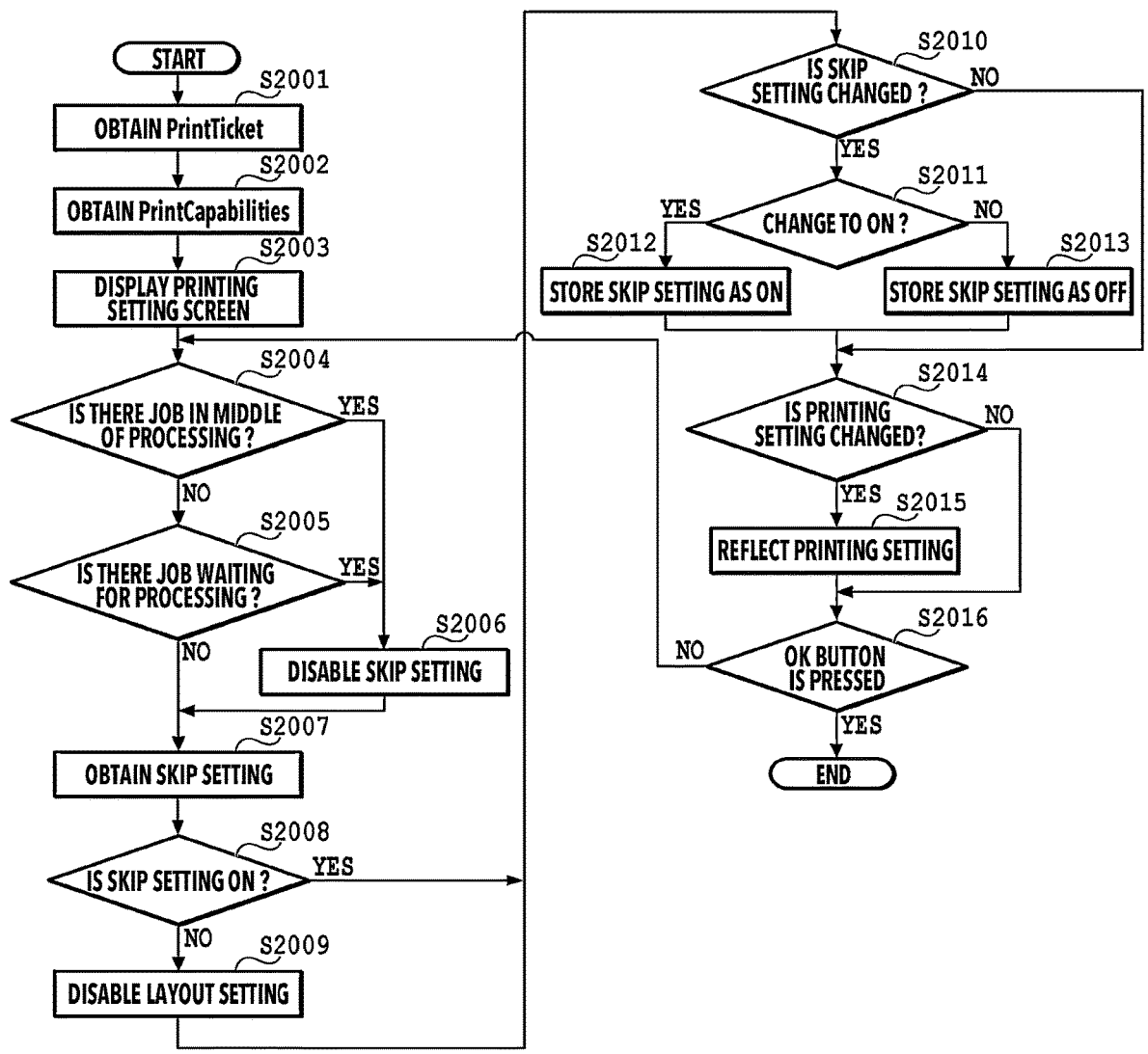
FIG. 20 is a flowchart illustrating an example of the edit processing of the printing function information.

FIG. 20 is a flowchart illustrating an example of the edit processing of the printing function information of the printing setting screen extension unit 205 in the present embodiment. Hereinafter, the printing setting screen extension unit 205 may be described as a unit having a central role in each processing; however, in reality, a corresponding function is implemented by the CPU 111 executing a corresponding program.

S2001 to S2003 are the same as S801 to S803; for this reason, the descriptions are omitted. In S2004, the printing setting screen extension unit 205 determines whether the extension application 204 is in the middle of processing of a job. In other words, whether there is a job in the middle of processing is determined. If it is determined in S2004 that there is a job in the middle of processing, the processing by the printing setting screen extension unit 205 proceeds to S2006, and if it is determined that there is no job in the middle of processing, the processing proceeds to S2005.

In S2005, the printing setting screen extension unit 205 determines whether there is a printing job waiting for processing in the printing data generation software 202 and the extension application 204. If it is determined in S2005 that there is a job waiting for processing, the processing by the printing setting screen extension unit 205 proceeds to S2006, and if it is determined that there is no job waiting for processing, the processing proceeds to S2007.

In S2006, the printing setting screen extension unit 205 disables the control item 905 through which the skip setting is set, and the processing proceeds to S2007. In other words, in a case where there is a job in the middle of processing or a job waiting for processing, there is a possibility that another job may be affected once the skip setting is changed. Thus, in a case where there is a job as described above, the control item 905 through which the skip setting is set is disabled. If it is determined it is No in both S2004 and S2005, the processing in S2006 is not performed, and the control item 905 through which the skip setting is set is not disabled. S2007 to S2016 are the same as the processing from S804 to S813; for this reason, the descriptions are omitted.

As described above, in the present embodiment, whether to allow the skip setting to be changed is switched depending on whether there is an already issued printing job with uncompleted processing. With this, it is possible to suppress an effect of the change in the skip setting on an already issued printing job.

The descriptions of the present embodiment are mainly about different points from the first embodiment; however, a mode combined with any one of the second embodiment from the fifth embodiment may be applicable.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-141472, filed Aug. 31, 2021, which is hereby incorporated by reference herein in its entirety.

What is claimed is:

1. A non-transitory computer readable storage medium storing an application program supporting a software program which causes an information processing apparatus to obtain capability information of a printer according to an Internet Printing Protocol, the application program executing a method, the method comprising:
converting data received from a drawing application to print data without causing the software program to convert the data to the print data.

2. The non-transitory computer readable storage medium according to claim 1, wherein, in the converting, the data received from the drawing application is converted to the print data which is able to be interpreted by the printer.

3. The non-transitory computer readable storage medium according to claim 2, wherein a format of the print data is determined based on the obtained capability information.

4. The non-transitory computer readable storage medium according to claim 1, wherein the software program causes the information processing apparatus to obtain the capability information of the printer from the printer according to the Internet Printing Protocol.

5. The non-transitory computer readable storage medium according to claim 1, wherein the print data is print data in which a plurality of pages have been laid out on one page.

6. The non-transitory computer readable storage medium according to claim 1, wherein the data is data of an XPS format and the print data is data of PWG Raster format.

7. The non-transitory computer readable storage medium according to claim 1, wherein the data is data of a GDI format and the print data is data of PWG Raster format.

8. The non-transitory computer readable storage medium according to claim 1, wherein the software program is a standard driver included as standard in an operating system.

9. The non-transitory computer readable storage medium according to claim 1, wherein
the software program is a program provided by a provider of an operating system.

10. A control method by an application program supporting a software program which causes an information processing apparatus to obtain capability information of a printer according to an Internet Printing Protocol, the control method comprising:
converting data received from a drawing application to print data without causing the software program to convert the data to the print data.

11. An information processing apparatus comprising an application program supporting a software program which causes an information processing apparatus to obtain capability information of a printer according to an Internet Printing Protocol, the information processing apparatus comprising:
a controller that converts data received from a drawing application to print data without causing the software program to convert the data to the print data.

* * * * *